United States Patent [19]
Hanson et al.

[11] Patent Number: 5,303,560
[45] Date of Patent: Apr. 19, 1994

[54] METHOD AND APPARATUS FOR MONITORING AND CONTROLLING THE OPERATION OF A REFRIGERATION UNIT

[75] Inventors: Jay L. Hanson, Bloomington; Doyle G. Herrig, Elko, both of Minn.

[73] Assignee: Thermo King Corporation, Minneapolis, Minn.

[21] Appl. No.: 46,314

[22] Filed: Apr. 15, 1993

[51] Int. Cl.⁵ ............................................. F25B 49/02
[52] U.S. Cl. ....................................... 62/126; 62/230; 361/22
[58] Field of Search ............... 62/125, 126, 127, 129, 62/230; 340/664; 361/22, 31, 87, 93, 94, 97; 236/94; 165/11.1

[56] References Cited

U.S. PATENT DOCUMENTS

| | | | |
|---|---|---|---|
| 4,307,775 | 12/1981 | Saunders et al. | 62/127 X |
| 4,663,725 | 5/1987 | Truckenbrod et al. | 364/505 |
| 4,709,292 | 11/1987 | Kuriyama et al. | 361/22 |
| 4,918,932 | 4/1990 | Gustafson et al. | 62/89 |
| 4,939,909 | 7/1990 | Tsuchiyama et al. | 62/230 X |
| 4,968,338 | 11/1990 | Sugiyama | 62/230 X |
| 5,123,252 | 6/1992 | Hanson | 62/89 |
| 5,123,253 | 6/1992 | Hanson et al. | 62/89 |
| 5,140,825 | 8/1992 | Hanson et al. | 62/89 |
| 5,140,826 | 8/1992 | Hanson et al. | 62/115 |

Primary Examiner—Harry B. Tanner
Attorney, Agent, or Firm—M. J. Moran

[57] ABSTRACT

Methods and apparatus for monitoring and controlling the operation of a refrigeration unit in a manner which eliminates the need for circuit breakers and fuses in control circuits which are instrumental in selecting and changing the operational mode of the refrigeration unit. When a need to change to a different operating mode is detected, a controller energizes a control device associated with the different operating mode and quickly determines if the current draw is within an acceptable range. If the current draw is within an acceptable range or window, the controller initiates the requested different operating mode. If the current draw is not within the acceptable range, the controller generates an appropriate alarm and different courses of action are decided upon which depend upon whether the current draw is above or below the limits of the acceptable range, the nature of the requested operating mode, and the desired temperature of a space conditioned by the refrigeration unit.

30 Claims, 12 Drawing Sheets

METHOD AND APPARATUS FOR MONITORING AND CONTROLLING THE OPERATION OF A REFRIGERATION UNIT

TECHNICAL FIELD

The invention relates to monitoring and controlling methods and apparatus for refrigeration units which have microprocessor based electrical control.

BACKGROUND ART

U.S. Pat. No. 4,663,725, which is assigned to the same assignee as the present application, discloses the use of microprocessor based transport refrigeration control for use with a refrigerated container, with the refrigerant compressor being driven by an electric motor. This patent is directed primarily to the use of a microprocessor to operate the various components of the refrigeration system according to predetermined algorithms, and to detect and record faults which occur during the operation thereof.

U.S. Pat. No. 4,918,932, which is assigned to the same assignee as the present application, discloses the use of a microprocessor to determine average error between an operator selected set point temperature and the temperature of a space to be conditioned, using the outputs of return air and discharge air sensors, and the use of the average error in the determination of an error signal which modulates the capacity of the system.

Our U.S. Pat. No. 5,140,825, which is assigned to the same assignee as the present application, discloses a method which checks electrical components and wiring of a microprocessor controlled refrigeration system by using a battery and a current shunt which measures battery current. All checking is accomplished with a refrigerant prime mover off, so that an alternator driven thereby will not affect battery draw current. Each electrical component to be checked is automatically successively connected and disconnected from the battery, the current draw is compared with appropriate current draw limits, and an alarm is provided when the current draw is outside the draw limits.

It would be desirable, and it is an object of the invention to be able to monitor current draw of a refrigeration unit while it is operating, which, along with the teachings in our aforesaid patent, will provide complete protection for a refrigeration unit.

Refrigeration control systems of which we are aware utilize circuit breakers and fuses to isolate faulty components. Circuit breakers and fuses often result in unnecessarily shutting down the associated refrigeration unit when it is still capable of preserving a conditioned load, and circuit breakers and fuses add component and assembly cost to a refrigeration unit. It would be desirable, and it is another object of the present invention, to eliminate the need for circuit breakers and fuses in critical control areas of a refrigeration system.

SUMMARY OF THE INVENTION

Briefly, the present invention includes a method of operating and monitoring a refrigeration unit which includes electrical control having a voltage source, a control circuit which includes a plurality of control devices, and a controller which selectively energizes and de-energizes the control devices via a plurality of control outputs. In a first embodiment of the invention, the method includes the steps of determining if the refrigeration unit is running, de-energizing the control outputs of the controller when the determining step finds the refrigeration unit is not running, measuring the magnitude of the current draw of the control circuit from the voltage source with the control outputs of the controller de-energized, providing a current reference value which indicates the maximum allowable current draw with the control outputs of the controller de-energized, comparing the measured current draw with the reference value, and providing an alarm which indicates the controller should be checked when the measured current draw exceeds the reference value.

In another embodiment of the invention the plurality of control devices includes a predetermined control device which enables starting of the refrigeration unit, and the method includes the steps of determining if the unit should be started when the unit is found not running, energizing the predetermined control device which enables the starting of the refrigeration unit, when the unit should be started, measuring the magnitude of the current draw of the control circuit after the predetermined control device is energized, providing a current draw window having upper and lower limits which define an allowable current draw range for the control circuit with the predetermined control device energized, comparing the latest measured current draw with the current draw window, starting the unit when the measured current draw is within the limits of the current draw window, and de-energizing the predetermined control device and providing an alarm when the measured current draw is not within the limits of the current draw window.

In another embodiment of the invention the refrigeration unit is operable in selectable different operating modes, with the plurality of control components including a control device associated with each operating mode, and the method includes the steps of running the unit, after the starting step, in a predetermined initial operating mode, determining when a different operating mode is required, energizing the control device associated with the different operating mode, measuring the magnitude of the current draw of the control circuit after the control device of the different operating mode is energized, providing a current draw window having upper and lower limits which define an allowable current draw range for the control circuit with the control device of the different operating mode energized, comparing the latest measured current draw with the current draw window, and initiating the different operating mode when the latest measured current draw is within the limits of the current draw window.

The invention also includes control apparatus for monitoring and controlling the operation of a refrigeration unit, with the electrical control apparatus including a voltage source, a control circuit which includes a plurality of control devices, and a controller which selectively activates the control components via a plurality of control outputs. A current shunt is disposed between the voltage source and the control circuit. The apparatus includes means determining if the refrigeration unit is operating, means de-energizing the control outputs of the controller when the refrigeration unit is not operating, means measuring the magnitude of the current draw of the control circuit with the control outputs of the controller de-energized, means providing a current reference value which indicates the maximum allowable current draw with the control outputs of the controller de-energized, means comparing the measured current draw with the reference value, and means providing an alarm which indicates the controller should be checked when the measured current draw exceeds the reference value.

In another embodiment of the apparatus, control means provides a plurality of different operating modes, including a control device controllable by an output of the controller for each of the plurality of different operational modes, means determines when a different operating mode is required, means energizes the control device associated with the different operating mode, means measures the magnitude of the current flowing through the current shunt when the control device of the different mode is energized, means provides a current draw window having upper and lower limits which define an allowable current draw range for the control circuit with the control device of the different mode energized, means compares the latest measured current draw with the current draw window, and means initiates the different operating mode when the measured current draw is within the limits of the current draw window.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

Figure 1:
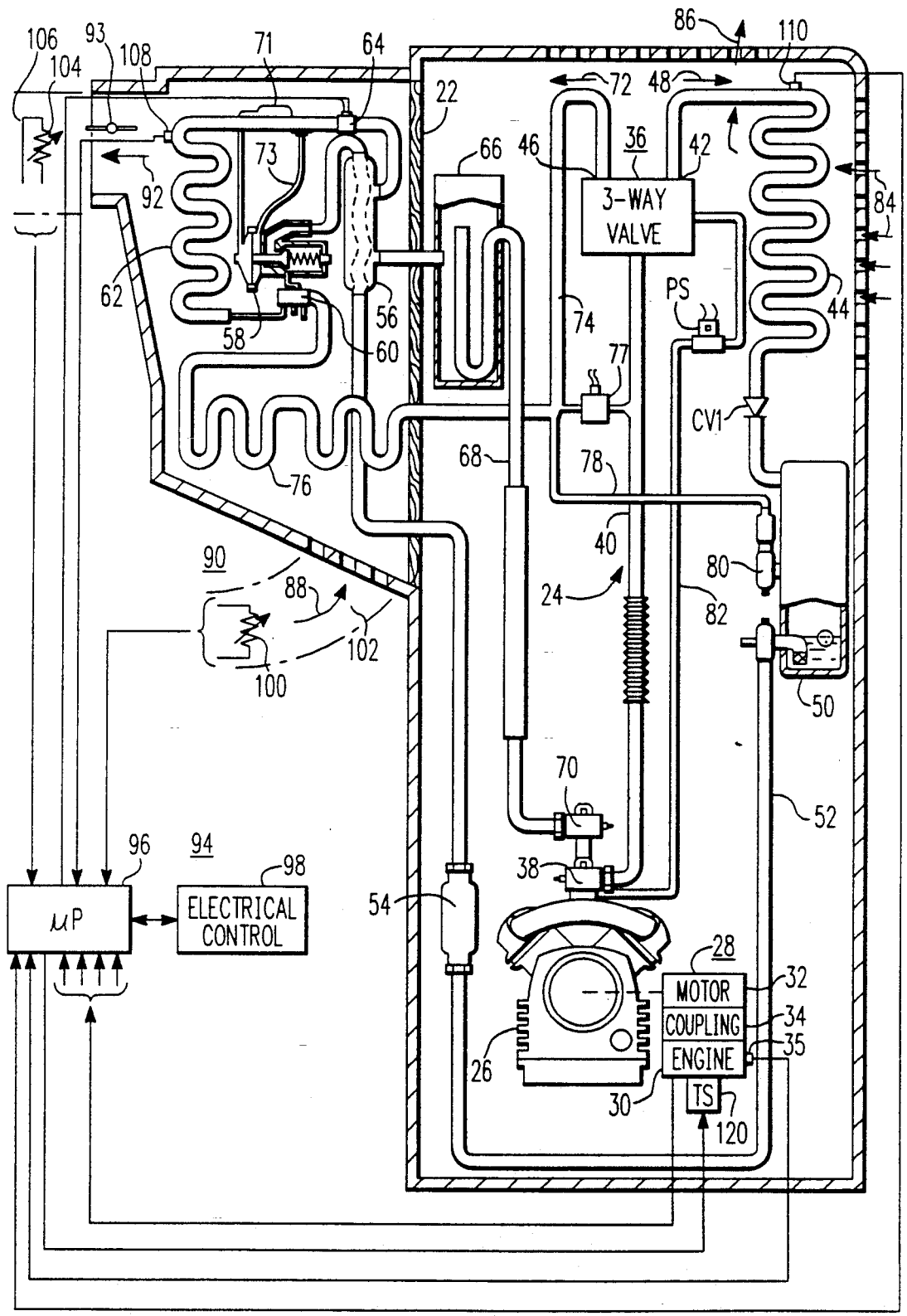
FIG. 1 is a partially block and partially schematic diagram of a refrigeration unit which may utilize the methods of the invention.

Referring now to the drawings, and to FIG. 1 in particular, there is shown a refrigeration unit 20 which may utilize the methods of the invention. Refrigeration unit 20 is especially suitable for use in transport applications, and as such may be mounted on a container, truck, or trailer, such as on a wall 22 thereof, for example. Refrigeration unit 20 has a closed fluid refrigerant circuit 24 which includes a refrigerant compressor 26 driven by a prime mover arrangement 28. Prime mover arrangement 28 includes an internal combustion engine 30, and an optional stand-by electric motor 32. Engine 30 and motor 32, when both are utilized, are coupled to compressor 26 by a suitable clutch or coupling 34 which disengages engine 30 while motor 32 is operative. A selector 174 shown in FIG. 2A selects one of the two prime movers and provides an output on conductor 35 to identify the selection.

Discharge ports of compressor 26 are connected to an inlet port of a three-way valve 36 via a discharge service valve 38 and a hot gas line 40. The functions of three-way valve 36, which selects heating and cooling cycles, may be provided by two separate valves, if desired. Three-way valve 36 has a first outlet port 42, which is selected to initiate a cooling cycle, with the first outlet port 42 being connected to the inlet side of a condenser coil 44. Three-way valve 36 has a second outlet port 46, which is selected to initiate a heating cycle, as will be hereinafter described.

When three-way valve 36 selects the cooling cycle outlet port 42, it connects compressor 26 in a first refrigerant circuit 48, which in addition to condenser coil 44, includes a one-way condenser check valve CVI, a receiver 50, a liquid line 52, a refrigerant drier 54, a heat exchanger 56, an expansion valve 58, a refrigerant distributor 60, an evaporator coil 62, an optional controllable suction line modulation valve 64, another path through heat exchanger 56, an accumulator 66, a suction line 68, and back to a suction port of compressor 26 via a suction line service valve 70. The operative prime mover may be protected against overload by controlling modulation valve 64 to provide the function of a conventional compressor throttling valve, as taught by U.S. Pat. No. 4,977,751, which is assigned to the same assignee as the present application; or, a conventional compressor throttling valve may be disposed in suction line 68, as desired. Expansion valve 58 is controlled by a thermal bulb 71 and an equalizer line 73.

When three-way valve 36 selects the heating cycle outlet port 46, it connects compressor 26 in a second refrigerant circuit 72. The second refrigerant circuit 72 by-passes condenser coil 44 and expansion valve 58, connecting the hot gas output of compressor 26 to the refrigerant distributor 60 via a hot gas line 74 and a defrost pan heater 76. A hot gas by-pass solenoid valve 77 may optionally be disposed to inject hot gas into hot gas line 74 during a cooling cycle. A by-pass or pressurizing line 78 connects hot gas line 74 to receiver 50 via by-pass and check valves 80, to force refrigerant from receiver 50 into an active refrigerant circuit during heating and defrost cycles.

A conduit or line 82 connects three-way valve 36 to the low pressure side of compressor 26 via a normally closed pilot solenoid valve PS. When solenoid valve PS is de-energized and thus closed, three-way valve 18 is spring biased to select the cooling cycle outlet port 42. When evaporator coil 62 requires defrosting, and when the load being conditioned requires heat to maintain set point, pilot solenoid valve PS is energized and the low pressure side of compressor 26 operates three-way valve 36 to select the heating cycle outlet port 46.

A condenser fan or blower (not shown) causes ambient air 84 to flow through condenser coil 44, with the resulting heated air 86 being discharged to the atmosphere. An evaporator fan or blower (not shown) draws air 88, called "return air", from a conditioned space 90, through the evaporator coil 62, and the resulting cooled or heated air 92, called "discharge air", is returned to conditioned space 90. During an evaporator defrost cycle, the evaporator fan or blower is not operated, and a defrost damper 93 may be operated to close the discharge air path to conditioned space 90.

Transport refrigeration unit 20 is controlled by electrical control 94 which includes a microprocessor based controller 96 and electrical control circuits and components 98. Electrical control circuits and components 98 includes relays, solenoids, and the like, as will be explained relative to FIGS. 2A and 2B. Controller 96 receives input signals from appropriate sensors, including inputs from: a set point temperature selector 99 which is manually actuated to select the desired temperature of conditioned space 90; an ambient air temperature sensor 101; a return air temperature sensor 100 disposed in a suitable return air path 102; a discharge air temperature sensor 104 disposed in a suitable discharge air path 106; a coil temperature sensor and switch 108 disposed to sense the temperature of the evaporator coil 62; a refrigerant pressure sensor (HPCO) 110 disposed on the high side of the refrigerant circuit 48; and from various engine sensors shown in FIG. 2B. Such engine sensors, for example, may include an oil level sensor 112, an oil pressure sensor 114, an engine coolant temperature sensor 116, and an engine speed sensor 118.

Controller 96, among other things, controls modulation valve 64, hot gas valve 77, and a throttle or high speed solenoid 120. Other functions controlled by controller 96 are shown in FIGS. 2A and 2B, and will be hereinafter described.

Figure 2A:
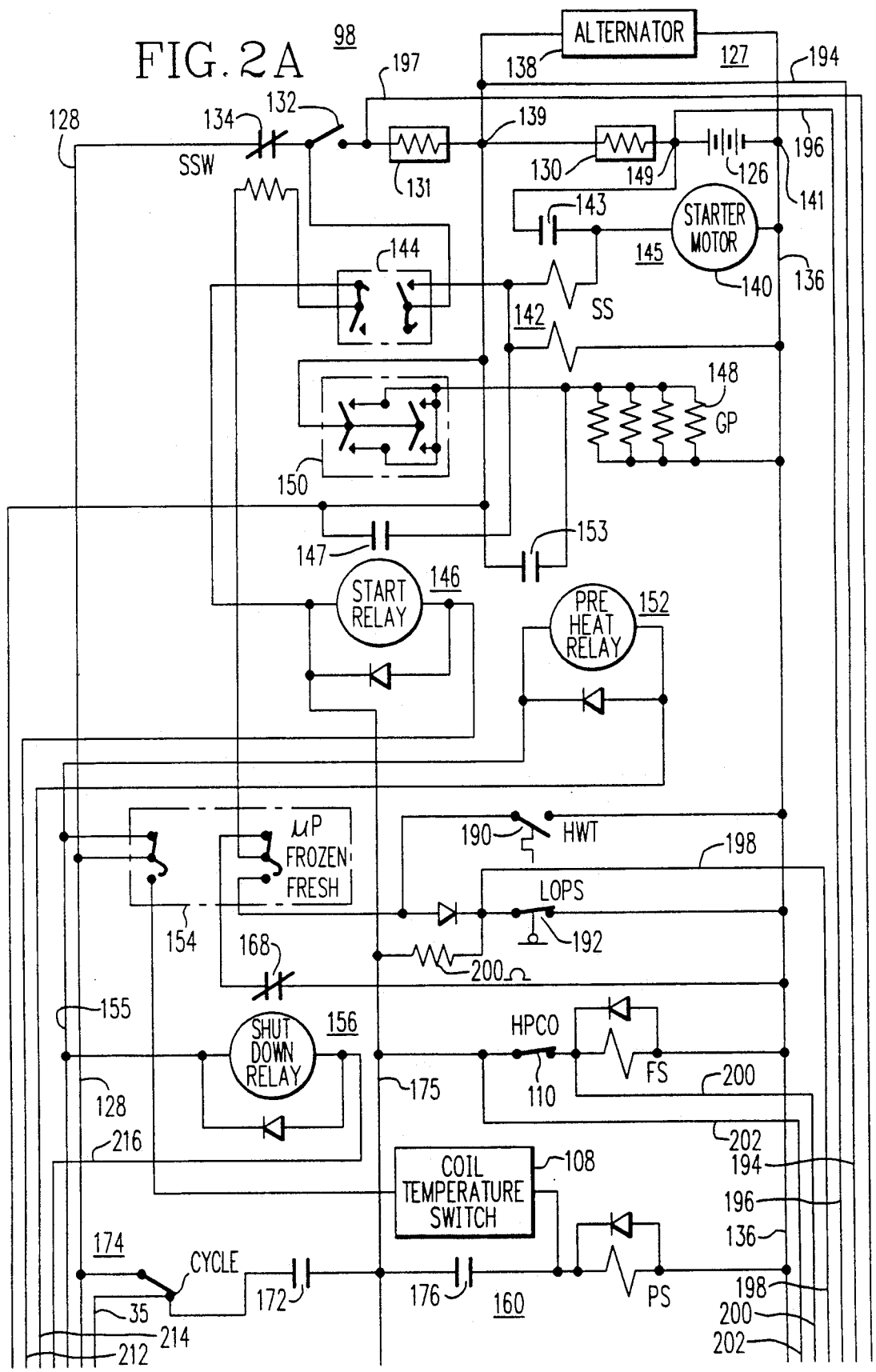
FIGS. 2A and 2B may be assembled to provide an electrical schematic diagram of microprocessor based electrical control shown in block form in FIG. 1, which is constructed according to the teachings of the invention.
Figure 2B:
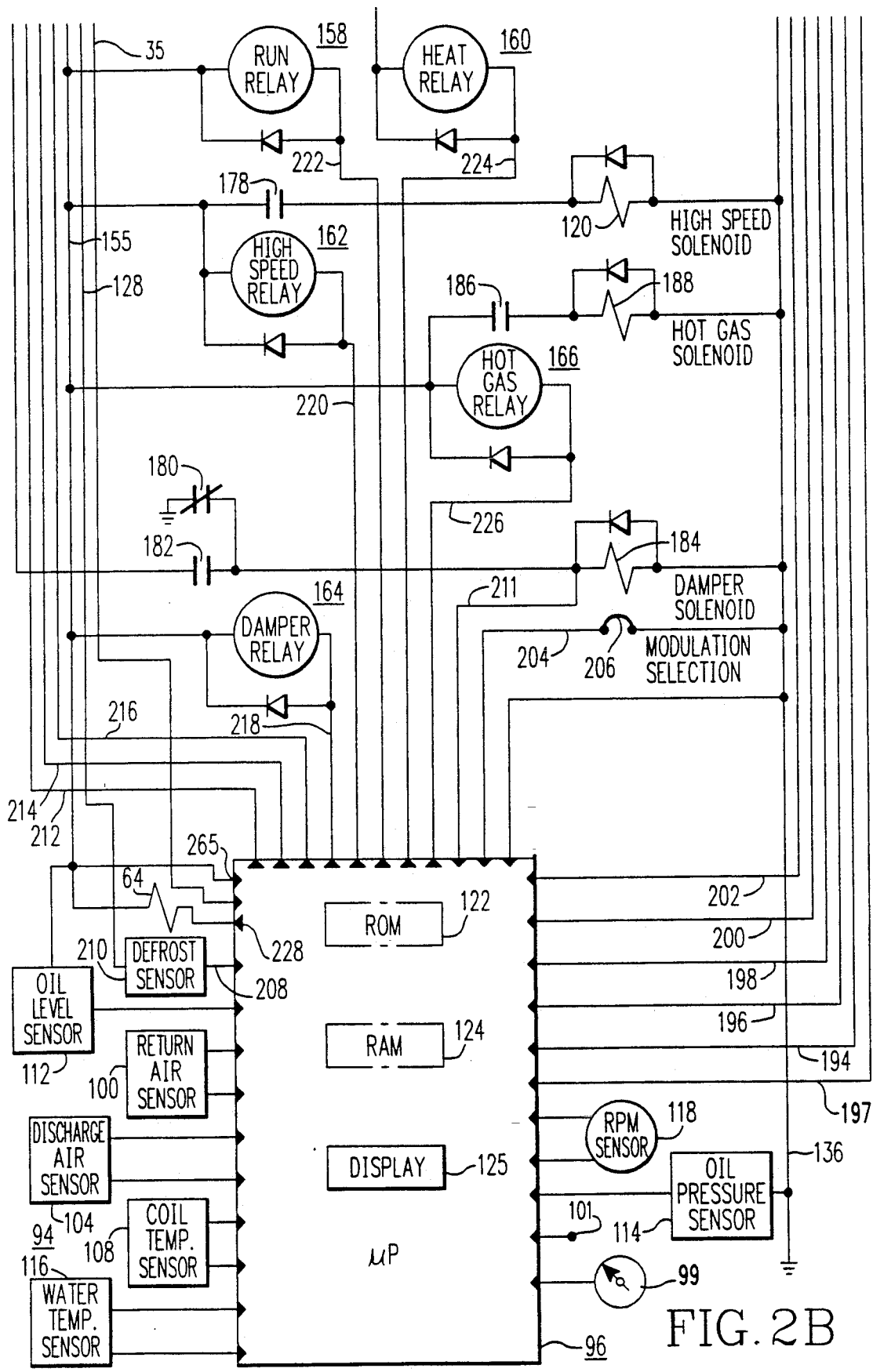

FIGS. 2A and 2B may be assembled to provide a detailed schematic diagram of electrical control 94, which includes microprocessor based controller 96 and control circuits and components 98. As is well known, controller 96 includes a read-only-memory (ROM) 122 for storing programs to be hereinafter described, and a random-access-memory (RAM) 124 for software timers, flags, input signals, output signals, and other values generated by the operating programs. Controller 96 also includes a display 125 for displaying fault codes, for flashing an alarm icon or indicator, for displaying system status via status lights, and the like.

Electrical control circuits and components 98 include a source of potential or power supply 127 having first and second conductors 128 and 136, respectively. Power supply 127 includes a battery 126 which has one side connected to the first power supply conductor 128 via a first DC current measuring shunt 130, which is used to measure battery charge and discharge current and will be hereinafter be referred to as battery shunt 130, a second DC current measuring shunt 131, which is used to measure the current draw of the control circuit and components connected to the power supply conductors 128 and 136 and will be hereinafter referred to as control shunt 131, an on-off switch 132, and normally closed contacts 134 of a protective reset switch SSW. The remaining side of battery 126 is connected to the second power supply conductor 136, which is grounded. Power supply 127 further includes a generator or alternator 138 driven by prime mover arrangement 28, with the generator or alternator 138 being connected from a junction point 139 between current shunts 130 and 131 to a point 141 on grounded conductor 136. Thus, junction points 139 and 141 form output terminals of power supply 127 which provide a voltage and current to the circuits and components connected thereto.

Control 98 also includes engine starting apparatus 145 for engine 30, with engine starting apparatus 145 having a portion which is connected directly to battery 126, e.g., to a junction 149 between the battery shunt 130 and battery 126, and a portion which is connected to power supply output terminal 139. More specifically, the portion of starting apparatus 145 which is connected to junction 149 includes a starter motor 140 which is controlled by a starter solenoid 142 having associated normally open contacts 143, an ignition switch 144, and a start relay 146 having associated normally open contacts 147. The portion of starting apparatus 145 which is connected to power supply output terminal 139, to enable current draw to be measured by the battery shunt 130, includes engine pre-heat control, including glow plug resistors (GP) 148, a pre-heat switch 150 and normally open contacts 153 of a pre-heat relay 152.

Control 98 also includes a three-position switch 154 which has two banks of three terminals each comprising a center terminal and upper and lower terminals, with reference to FIG. 2A. Switch 154, in the illustrated upper position which connects the center terminal to the upper terminal, places unit 20 under control of controller 96. The upper position provides voltage from conductor 128 to a conductor 155. An intermediate position of switch 154, in which the center terminal is not connected to either the upper terminal or the lower terminal, is selected when controller 96 is not utilized and the load in the conditioned space 90 is frozen. This switch position will cause unit 20 to operate continuously in a low speed cool mode LSC. The lower position of switch 154 is selected when controller 96 is not utilized and the load in the conditioned space is non-frozen. This position of switch 154 will cause unit 10 to operate continuously, cycling between heating and cooling cycles under the control of the hereinbefore mentioned coil temperature sensor and switch 108. Coil temperature sensor and switch 108 is preset to close at a predetermined coil temperature, such as 35° F. (1.7° C.), to energize the pilot solenoid PS and initiate a heating cycle, and to open at a predetermined higher temperature, such as 38° F. (3.3° C.), to de-energize pilot solenoid PS and initiate a cooling cycle.

In addition to the control devices or relays already mentioned, control 98 includes control devices in the form of a shutdown relay 156, a run relay 158, a heat relay 160, a high speed relay 162, a defrost damper relay 164, and a hot gas relay 166. Shutdown relay 156 is normally energized, and is de-energized to shut unit 10 down via its associated set of normally-closed contacts 168 which ground the protective switch SSW and cause it to open its contacts 134. The run relay 158 has normally open contacts 172 connected to a mode selector switch 174 which has an input connected to conductor 128. Selector switch 174 selects either: (1) a continuous operating mode in which a prime mover of arrangement 28 operates continuously; or, (2) a cycling start-stop mode, which includes starting and stopping of a prime mover of the prime mover arrangement 28. The selection is communicated to an input of controller 96 via conductor 35.

Contacts 172 provide voltage to a conductor 175 from conductor 128 and mode selector switch 174. Run relay 158 must be energized to enable the starting and running of refrigeration unit 20 via engine 30. When unit 20 is started, control 98 is arranged to always start operation in a predetermined operating mode, which in the exemplary embodiment is a low speed cool (LSC) cycling operating mode. The LSC operating mode is selected by the de-energized position of heat relay 160, which selects a cooling cycle, and by the de-energized position of high speed relay 162, which selects the lower of two operating speeds of engine 30.

Heat relay 160 has a set of normally open contacts 176 for controlling the pilot solenoid PS. High speed relay 162 has a set of normally open contacts 178 for controlling the high speed solenoid 120. Damper relay 164 has a set of normally closed contacts 180 and a set of normally open contacts 182, connected to control a defrost damper solenoid 184 which is linked to defrost damper 93. Hot gas relay 166 is provided for controlling the hot gas valve 77 via a set of normally open contacts 186 and a solenoid 188.

Control 98 also includes a engine coolant temperature switch (HWT) 190, which closes when the engine coolant reaches a predetermined elevated temperature, and a low oil pressure switch (LOPS) 192 which is open as long as engine oil pressure is normal. The closing of either switch 190 or 192 will shut unit 20 down via the manual reset switch SSW.

Controller 96 senses the voltage across the battery shunt 130 via conductors 194 and 196, and can thus determine the magnitude and polarity of battery current. One polarity, which will be called positive, indicates the battery 126 is being charged by alternator 138, which also indicates the prime mover 28 is running. The other polarity, i.e., negative, indicates the battery is discharging.

Controller 96 senses the voltage across the control shunt 131 via conductors 197 and 194. Microprocessor 96 can thus determine the magnitude of the current draw provided by the source of potential 127, comprised of battery 126 and alternator 138, to the various components selectively connected by controller 96 between conductors 128 and 136.

Controller 96 also has a conductor 198 which senses the position of the low oil pressure switch 192, conductors 200 and 202 which sense the voltage level on first and second sides, respectively, of the high refrigerant pressure cut-out switch 110, a conductor 204 which senses whether or not a modulation valve selector jumper 206 has connected conductor 204 to system ground 136, a conductor 208 which senses whether or not a defrost sensor switch 210 has operated, signifying the need for a defrost cycle, and a conductor 211 which detects voltage on the damper solenoid 184.

Controller 96 has a plurality of output conductors or drive lines for controlling the energization and de-energization of a plurality of control devices, including conductors 212, 214, 216, 218, 220, 222, 224 and 226 for respectively controlling the operation of start relay 146, pre-heat relay 152, shutdown relay 156, damper relay 164, high speed relay 162, run relay 158, heat relay 160, and hot gas relay 166. A conductor 228 is also provided for controlling the current level in modulation valve 64.

In the prior art it would be conventional to provide a circuit breaker on each side of on-off switch 132, a circuit breaker in series with modulation valve 64, and fuses in each of the driver lines 212, 214, 216, 218, 220, 222, 224, and 226. The need for these circuit breakers and fuses is eliminated by the methods and apparatus of the invention.

As the various functions performed by controller 96 are described, only those necessary to understanding the invention will be described in detail. Certain of the functions shown in block form, may be described in detail and claimed in U.S. Pat. Nos. 5,123,252; 5,123,253; 5,140,825; and 5,140,826, which are assigned to the same assignee as the present application.

Figure 3:
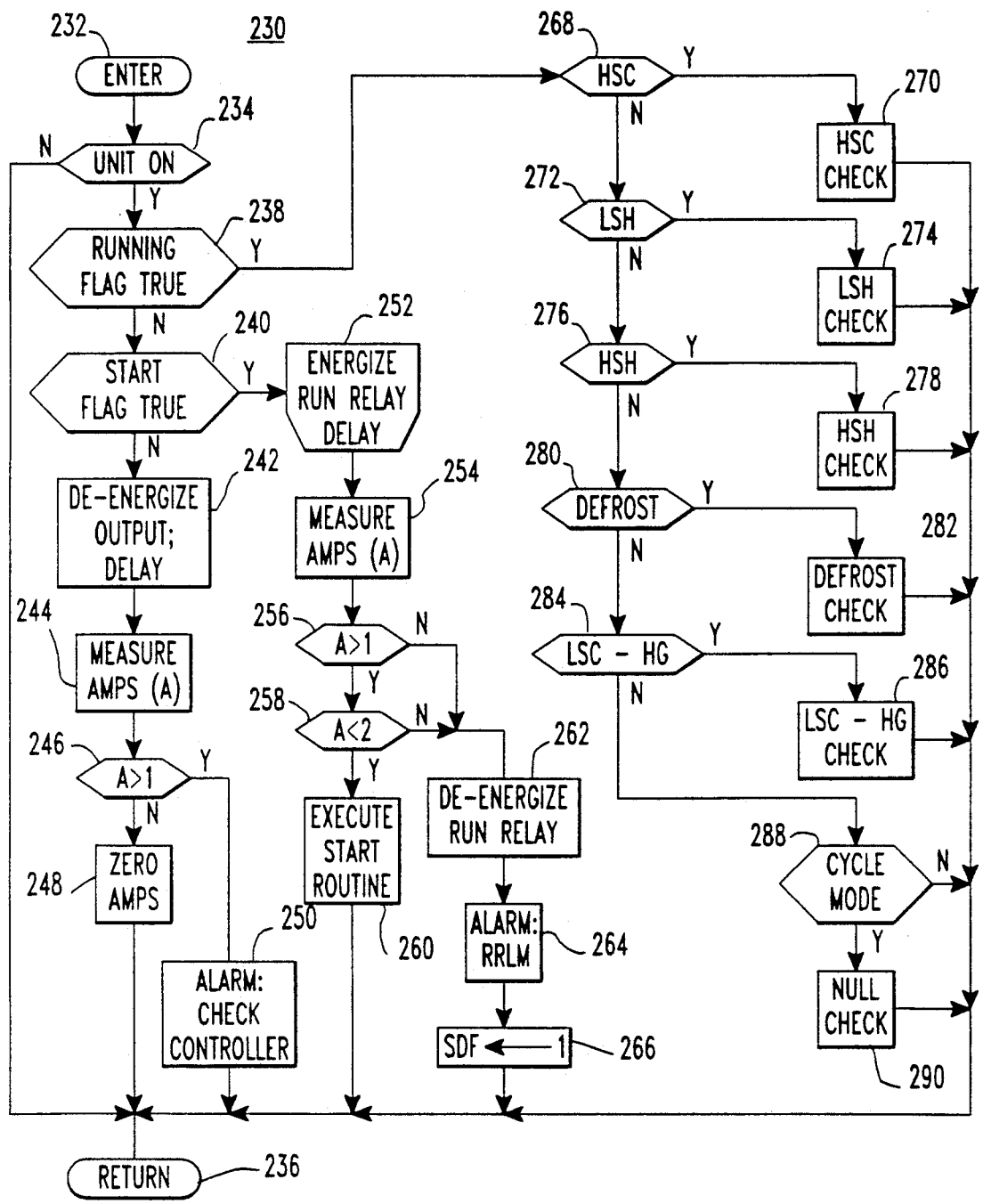
FIG. 3 is a flow diagram of a program which monitors and controls a refrigeration unit according to the teachings of the invention.

FIG. 3 is a flow diagram of a program 230 which implements the methods of the invention. Program 230 is periodically entered at 232 and step 234 checks the voltage level of conductor 128 to determine if the on-off switch 132 has been closed to turn refrigeration unit 20 on. If step 234 finds that switch 132 is open, program 230 exits at 236. When step 234 finds switch 132 closed, step 238 determines if a running flag stored in RAM 124 has been set to a true state by a program which has detected the need for unit 20 to run. The hereinbefore mentioned U.S. Pat. No. 5,140,826 includes programs which detect the need to start refrigeration unit 20, for setting engine start flag true upon such detection, and for starting the engine 30. A "need to start" engine 30 occurs when the temperature of the conditioned space 90 moves outside a predetermined null temperature band adjacent to the set point temperature selected on set point selector 99 shown in FIG. 2B, and also when the water temperature sensor 116 indicates that engine 30 should be started before engine 30 becomes too cold and thus difficult to start.

If step 240 finds that the engine start flag is not true, step 242 de-energizes the control outputs 212, 214, 216, 218, 220, 222, 224 and 226 which are respectively associated with the control devices or relays 146, 152, 156, 164, 162, 158, 160 and 166. Driver line 228 associated with modulation valve 64 is also de-energized, and a delay timer is started to provide time for the current draw to decay to a stable value, with a delay such as about 3 seconds being suitable. In every current measurement made after the energization, or de-energization, of a control device, this delay timer, which may be in software, is started to provide time for the current to stabilize, and this delay time will not be mentioned again while going through the various programs of the invention.

Step 244 measures the current draw "A" of the circuits and devices connected between conductors 128 and 136 of power supply 127. In our hereinbefore mentioned U.S. Pat. No. 5,140,825 battery shunt 130 was used to measure current draw, and all current checks were made with zero output from alternator 138, as it was desired to measure the battery draw or discharge current. In the present invention, almost all of the current draw measurements are made with a prime mover of the prime mover arrangement 28 operating, and thus it is not battery charging or discharging current that is measured, but actual current draw from power supply 127 as sensed by control shunt 131. Since at this point of program 230 unit 20 is not operating, it would not make any difference whether battery shunt 130 or current shunt 131 is used to measure the current in step 244, but after unit 20 is started it is important that all current measurements be made with control shunt 131. Thus, in step 244 controller 96 measures the current flow through shunt 131 via conductors 194 and 197.

Control shunt 131 is sized to the current rating of the output control lines or drivers of controller 96, so that a short circuit will not take out a driver before the controller 96 can respond and shut the output off. The control shunt 131 may be multiplexed with the battery shunt 130 to provide a continuous ampere checking feature while unit 20 is running. The control shunt 131, for example, may be a 1.5 ohm shunt and the driver outputs from controller 96 may be 12 ampere outputs. The current drawn by the glow plugs 148 and starter 140 is measured by the battery shunt 130, which may be a 0.005 ohm shunt, for example.

With all of the control outputs of controller 96 de-energized, the current draw should be very low, less than some predetermined maximum allowable value, such as 1 ampere. This reference value is predetermined by the particular characteristics of controller 96 and stored in ROM 122 for use in the next step 246. Step 246 compares the measured current draw A with the reference value, e.g., 1 ampere in this example. If step 246 finds that the measured value A does not exceed the reference value, controller 96 is operating properly and step 248 zeros the reading so that all future measurements will measure the actual current drawn by an energized device, without the low level current burden of the controller circuits. Should step 246 find that the measured current exceeds the reference value, step 246 goes to step 250 which stores an alarm code which identifies controller 96 as the cause of the alarm and flashes an alarm indicator or icon on display 125 to alert operating personnel. The alarm code is also displayed, or available for display, on display 125. Thus, the portion of program 230 to this point detects an internal problem in controller 96 when unit 20 is "on" but controller 96 is not being called on to perform any control functions. Both steps 248 and 250 return to program exit point 236 and program 230 will be quickly reentered at point 232, at a predetermined cycle time, such as every 0.1 second, for example.

Program 230 cycles through the hereinbefore recited steps until step 240 finds that the engine start flag has been set to a true state, at which point program 230 branches to step 252 which energizes run relay 158 via driver or output line 222. In our hereinbefore mentioned U.S. Pat. No. 5,140,826 run relay 158 was energized as part of a unit start routine. In the present invention the run relay 158 is energized before the unit start routine is executed, to quickly check current draw before actually initiating the run mode. Step 254 measures the current draw and steps 256 and 258 form a current window having predetermined lower and upper limits which define maximum and minimum current levels with run relay 158 energized. The values for this current draw window, and all others to be hereinafter described, as well as maximum allowable current reference values, are all predetermined and stored in ROM 122 for use by the various programs, and thus this fact will not be mentioned again while describing the programs.

More specifically, step 256 compares the measured current draw "A" with the lower limit, e.g., 1 ampere, and if the measured current draw "A" obtained in step 254 exceeds this lower limit it indicates that run relay 158 picked up and step 256 advances to step 258 which checks the measured current draw with an upper limit, e.g., 2 amperes, which if exceeded indicates a possible short circuit in run relay 158 or its associated wiring. If step 258 finds that the measured current draw does not exceed the upper limit of the allowable current window, step 260 executes a start routine for starting engine 30. The hereinbefore mentioned U.S. Pat. No. 5,140,826 describes a start routine which may be executed by step 260.

If the measured current draw is below or above the lower and upper limits, respectively, steps 256 and 258 will branch to step 262 which de-energizes run relay 158 before high current can cause circuit damage, and step 264 stores an alarm code RRLM, which indicates a fault exists in the run relay 158 or associated circuits, and the alarm indicator light is flashed on display 125. Step 266 initiates shut down of unit 20 by setting a unit shut-down flag SDF true, e.g., to the logic one level, and other programs such as illustrated in U.S. Pat. No. 5,140,826, will shut the unit down upon finding shut down flag SDF true. Run relay 158 must be energized to enable engine 30 to be started, and it will be energized throughout the operation of unit 20. Thus, if there is a problem with run relay 158 it must be corrected before engine 30 is started.

Refrigeration unit 20 is started and run initially in a low speed cool cycling mode, and until this is accomplished a unit running flag will not be set true. Unit 20 cannot switch to other operating modes until the unit running flag is set true. To start and run in a low speed cool cycling mode it is only necessary to energize run relay 158. All other operating modes are executed by energizing one or more of the remaining relays. The present invention detects the need for unit 20 to switch from the low speed cool mode to a different operating mode, and the invention checks each newly requested mode for current draw before the requested mode change is actually executed.

More specifically, when step 238 finds the unit running flag true, program 230 branches to step 268 which initiates a portion of program 230 which checks for requests to change to a different operating mode. Step 268 determines if unit 20 requires a change from the low speed cool mode (LSC) to a high speed cool mode (HSC), which requires that the high speed relay 162 to be energized. If step 268 detects the need to change to the HSC mode, a program 270 implements a check of this requested mode, with program 270 for performing this check being illustrated in FIG. 4.

If step 268 finds that the HSC mode is not required, step 272 determines if a low speed heat (LSH) mode is requested, which requires the energization of heat relay 160. If the LSH mode is required, a program 274 illustrated in FIG. 5 performs a current check of this mode before actually executing the mode change.

If step 272 finds that the LSH mode is not required, step 276 determines if a high speed heat (HSH) mode is requested, which requires the energization of heat relay 160 and high speed relay 162. If the HSH mode is required, program 278 illustrated in FIG. 6 performs a current check of this mode before executing the mode change.

If step 276 finds that the HSH mode is not required, step 280 determines if a defrost mode is requested to defrost evaporator coil 62, which mode requires the energization of heat relay 160 and damper relay 164. If the defrost mode is requested, program 282 illustrated in FIGS. 7A and 7B performs the necessary current check procedures before entering the defrost mode.

If step 280 finds that the defrost mode is not required, step 280 determines if a low speed cool- hot gas (LSC-HG) mode, with or without suction line modulation, is requested. If the LSC-HG mode is requested, program 286 shown in FIGS. 8A and 8B performs the necessary current check procedure before executing the mode change.

If step 284 finds that the LSC-HG mode is not being requested, step 288 determines if unit 20 is operating in cycle mode or continuous mode, as selected by selector switch 174 shown in FIG. 2A. If step 288 finds that cycle mode has been selected, a program 290 illustrated in FIG. 9 determines if the conditions for the null mode have been satisfied, and, if so, this program de-energizes all of the control outputs of controller 96 and takes this opportunity to again check controller 96 for internal faults.

Figure 4:
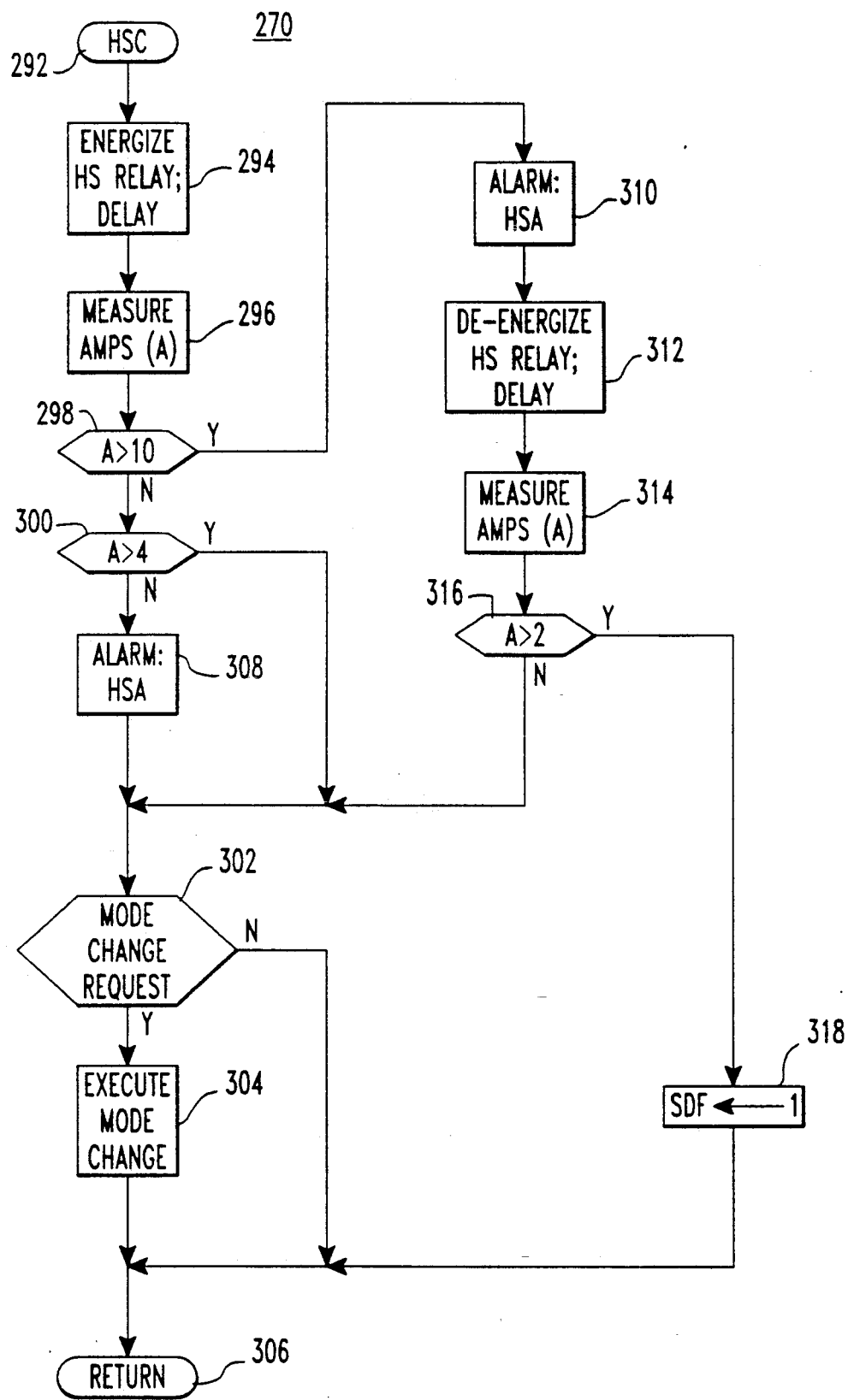
FIG. 4 is a flow diagram called by the program of FIG. 3 which monitors and controls a requested change between low speed cool (LSC) and high speed cool (HSC) operating modes.

Referring now to FIG. 4, which illustrates program 270 which is called after step 268 finds that unit 20 is requesting a change from the LSC mode to the HSC mode, program 270 is entered at 292 and step 294 energizes high speed relay 162 via driver line 220. Step 296 measures the current flowing through control shunt 131, to provide a measured value "A", and steps 298 and 300 compare upper and lower limits of an allowable current window with the measured value "A", with the current window defining the allowable current range with run relay 158 and high speed relay 162 both energized. If step 298 finds that the measured current value does not exceed the upper limit of the allowable current draw window, e.g., 10 amperes, step 300 checks the measured current value with the lower limit, e.g., 4 amperes. If the measured current draw is within the current draw window, step 300 advances to step 302 to confirm that the refrigeration unit 20 still requires a change from the LSC mode to HSC mode. If the mode change request is still valid, step 304 executes the mode change, including maintaining high speed relay 162 energized which energizes high speed solenoid 120 to increases the speed of engine 30 to the higher of two selected operating speeds. If step 302 finds the mode change request no longer valid, step 302 exits program 270 at 306.

If the measured current draw does not exceed 10 amperes, but is less than the lower limit of 4 amperes, the high speed relay 162 did not pick up and step 300 advances to step 308 which records an alarm HSA, which indicates that the high speed relay 162 and associated wiring should be checked. The flashing alarm on display 125 is also energized. In this instance, the mode change in step 304 will simply result in unit 20 remaining in the LSC operating mode.

If the measured current draw exceeds the upper limit of 10 amperes, step 310 records alarm HSA and energizes the flashing alarm, and step 312 immediately de-energizes high speed relay 162 as there is a fault in the relay or its associated wiring. Step 314 measures the current flow through control shunt 131 after high speed relay is de-energized and step 316 compares the last measured current draw with a maximum allowable current reference value with only run relay 158 energized, e.g., a reference value of 2 amperes. If the measured current draw is less than the reference value, it indicates the high speed relay 162 properly dropped out in response to step 312 and step 316 goes to step 302. In this instance, step 304 will result in unit 20 remaining in the LSC operating mode.

If step 316 finds that the last measured current draw exceeds the reference value of 2 amperes, with the term "last measured current draw" referring to the current measurement made in step 314, to distinguish it from the prior current measurement made in step 296, it indicates that high speed relay 162 did not drop out in response to step 312 and that the high current measurement found in step 298 still exists. Thus, with this existing high current condition unit 20 should be immediately shut down, and step 318 sets the shut down flag SDF true, to initiate unit shut down.

Figure 5:
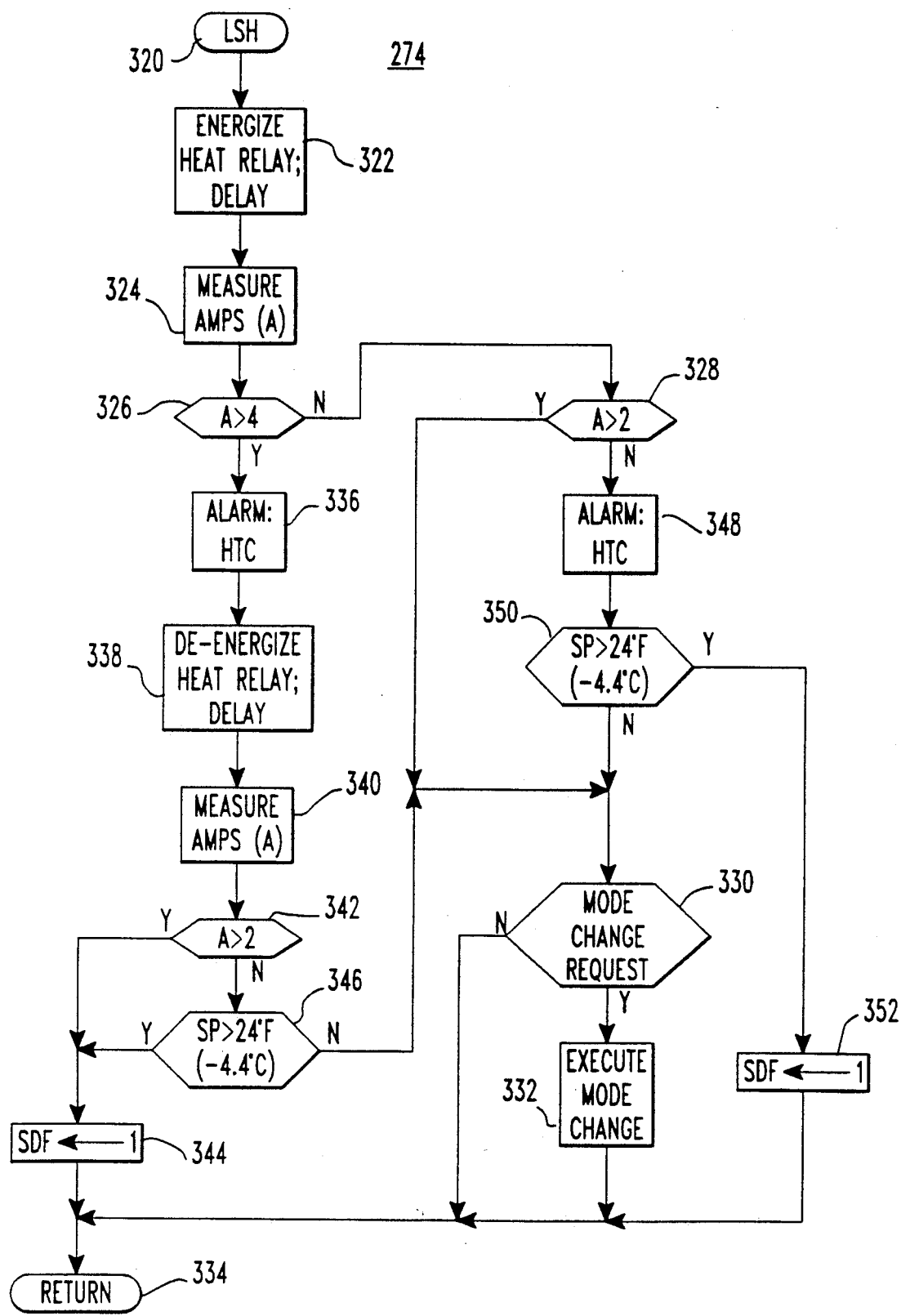
FIG. 5 is a flow diagram called by the program of FIG. 3 which monitors and controls a requested change to a low speed heat (LSH) operating mode.

When step 272 in FIG. 3 finds that unit 20 requires a change from the LSC operating mode to the low speed heat (LSH) operating mode, program 274 in FIG. 5 is entered at 320 and step 322 energizes heat relay 160 via driver line 224. Step 324 measures the current flow through control shunt 131 and steps 326 and 328 apply upper and lower limit tests of an allowable current draw window tailored for the simultaneous energization of both the run relay 158 and the heat relay 160. If the measured current draw passes the upper and lower current window limit tests of steps 326 and 328, program 274 advances to steps 330 and 332 which execute the change to the LSH operating mode, if the request is still valid, and program 274 exits at 334.

If the measured current draw obtained in step 324 exceeds the upper limit, e.g., 4 amperes, step 336 records alarm HTC which indicates heat relay 160 and its associated wiring should be checked, a flashing alarm on display 125 is energized, and heat relay 160 is immediately de-energized in step 338. Step 340 measures the current draw following the de-energization of heat relay 160 and step 343 compares the measured current draw with a maximum allowable current value with only run relay 158 energized, e.g., 2 amperes. If the measured current draw exceeds the reference value of 2 amperes, it indicates that heat relay 160 failed to drop out properly and that the high current condition detected by step 326 still exists. Step 342 thus advances to step 344 which initiates unit shut down by setting shut down flag SDF true, and program 274 exits at 334.

If step 342 finds the last measured current draw, i.e., the measurement of step 340, is less than the maximum allowable current reference value of 2 amperes, heat relay 160 properly dropped out in response to step 338. However, with a fault in the heat relay 160 or its associated wiring, unit 20 has no heating capability. If there is a frozen load in conditioned space 90 the lack of a heating mode is not a problem, but if there is a non-frozen load in conditioned space 90, such as fresh produce, flowers, and the like, unit 20 requires immediate service and should be shut down to prevent freezing of the load. Thus step 342, upon finding that heat relay 160 dropped out properly, advances to step 346 which determines the nature of the load in conditioned space 90. For example, step 346 may compare the set point temperature SP selected on set point selector 99 with a reference value such as 24° F. (−4.4° C.). If the set point temperature SP exceeds the reference value, a non-frozen load is being conditioned and step 346 proceeds to step 344 to shut unit 20 down. If the set point temperature SP does not exceed the reference, a frozen load is being conditioned and step 346 proceeds to steps 330 and 332. In this instance the mode change executed in step 332 will simply maintain unit 20 in the LSC operating mode. If desired, instead of step 346 proceeding immediately to step 344 upon finding a non-frozen load, the reading of ambient air temperature sensor 101 may be compared with a predetermined reference value, such as 32° F. (0° C.), with program 274 advancing to step 344 upon finding the sensed ambient temperature places the load in danger of freezing, and advancing to step 330 upon finding that the load is not presently in danger of freezing.

Should the measured current draw of step 324 pass the upper limit test of step 326 but fail the lower limit test of step 328, which indicates that heat relay 160 failed to pick up when energized in step 322, step 328 advances to step 348 which records alarm HTC and flashes an alarm icon on display 125. Step 350 performs the same test as step 346 regarding the nature of the load in conditioned space 90, advancing to step 330 with a frozen load, to allow continued operation of unit 20 in the LSC mode, and advancing to step 352 with a non-frozen load to initiate unit shut down. Again, if desired, an ambient temperature test may be inserted between steps 350 and 352, as described relative to steps 346 and 344.

Figure 6:
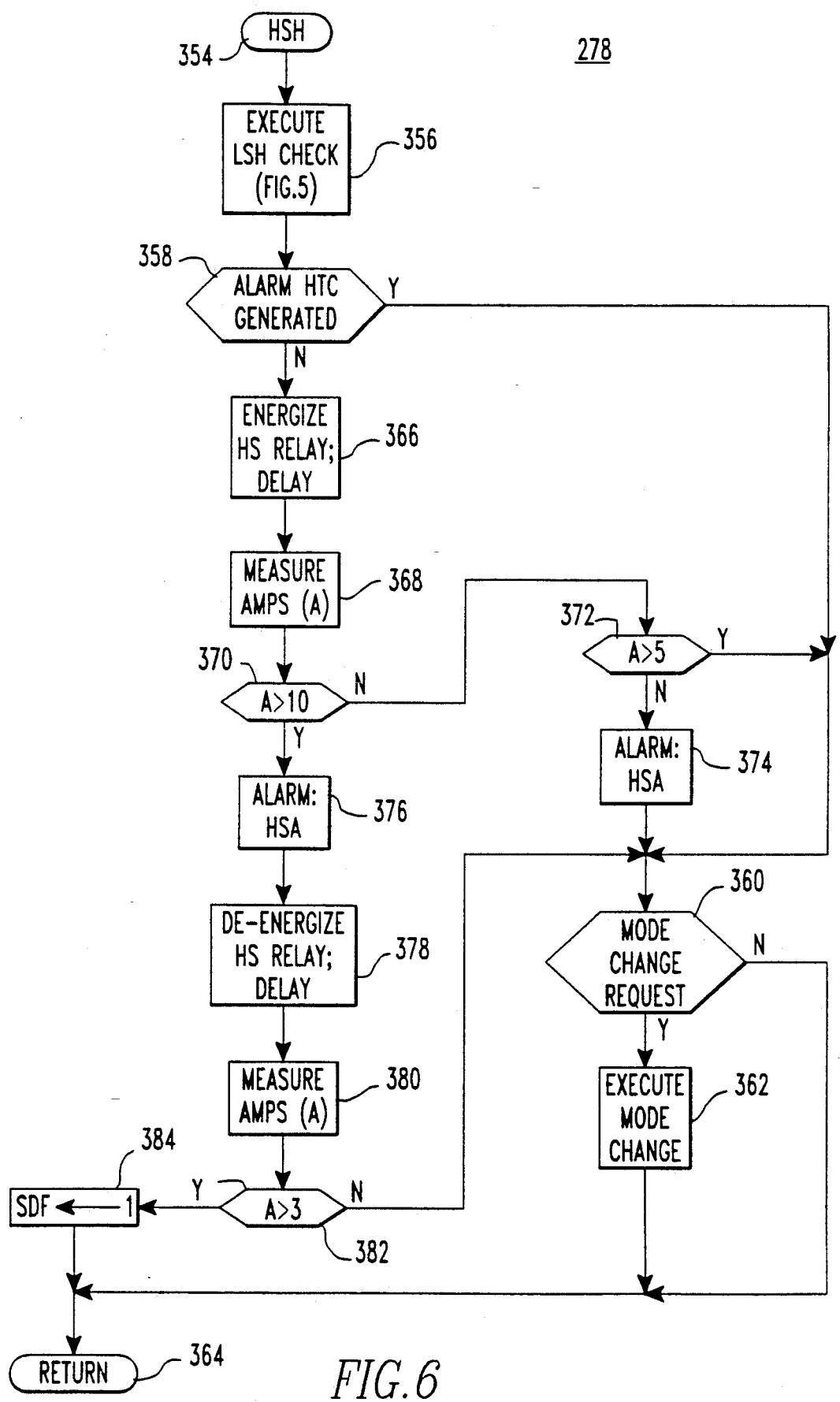
FIG. 6 is a flow diagram called by the program of FIG. 3 which monitors and controls a requested change to a high speed heat (HSH) operating mode.

Should step 276 of FIG. 3 find that the high speed heat mode HSH has been requested, program 278 in FIG. 6 is entered at point 354 and step 356 executes program 274 illustrated in FIG. 5, which was just described, to check the low speed heat mode LSH before going to the high speed heat mode HSH. If a problem with the heat relay 160 is found in program 274 which shuts unit 20 down, step 358 will not be reached. If step 358 is reached it indicates that unit 20 was not shut down and unit 20 is either properly running in LSH, or running in LSC with a frozen load. Step 358 determines which event has occurred by checking to determine if alarm HTC was recorded during the running of program 274 in step 356. If alarm HTC was recorded, step 358 advances to steps 360 and 362, which in this instance will result in maintaining unit 20 in the low speed cool mode LSC, and program 278 exits at 364.

When step 358 finds that no alarms were recorded during the running of program 274, step 358 advances to step 366 which energizes high speed relay 162 via driver line 220. Step 368 measures the current flow through control shunt 131 and steps 370 and 372 apply upper and lower limit tests of an allowable current draw window with run relay 158, heat relay 160 and high speed relay 162 all energized. If the measured current draw is within the limits of the allowable current draw window, step 372 advances to steps 360 and 362 which execute the high speed heat mode, if the request is still valid, which includes maintaining heat relay 160 and high speed relay 162 energized, resulting in the energization of pilot solenoid PS and high speed solenoid 188.

If step 370 finds the upper limit, e.g., 10 amperes, has been exceeded by the current measurement in step 368, step 376 records high speed alarm HSA and flashes an alarm icon on display 125, and step 378 immediately de-energizes high speed relay 162. Step 380 measures the current draw through control shunt 131 and step 382 compares the measurement with a maximum allowable current reference value, e.g., 3 amperes. If step 382 finds that the latest current measurement, i.e., the current measurement of step 380, exceeds 3 amperes, the high speed relay 162 did not properly respond to step 378 and the high current condition detected in step 370 still exists. Thus, step 382 advances to step 384 which initiates unit shut down, and program 278 exits at 364.

If step 382 finds that the latest current measurement does not exceed the 3 ampere reference value, the high speed relay properly dropped out in response to step 378 and step 382 advances to steps 360 and 363, which in this instance operates unit 20 in the low speed heat mode LSH.

If step 372 finds that the current measurement of step 368 is below the lower limit of 5 amperes, the high speed relay 162 apparently failed to pick up in response to step 366. Step 374 records alarm HSA and energizes a flashing alarm indicator on display 125. Since there is no high current condition, step 374 advances to steps 360 and 362, which, if the mode change request is still valid, will operate unit 20 in low speed heat mode LSH.

Figure 7A:
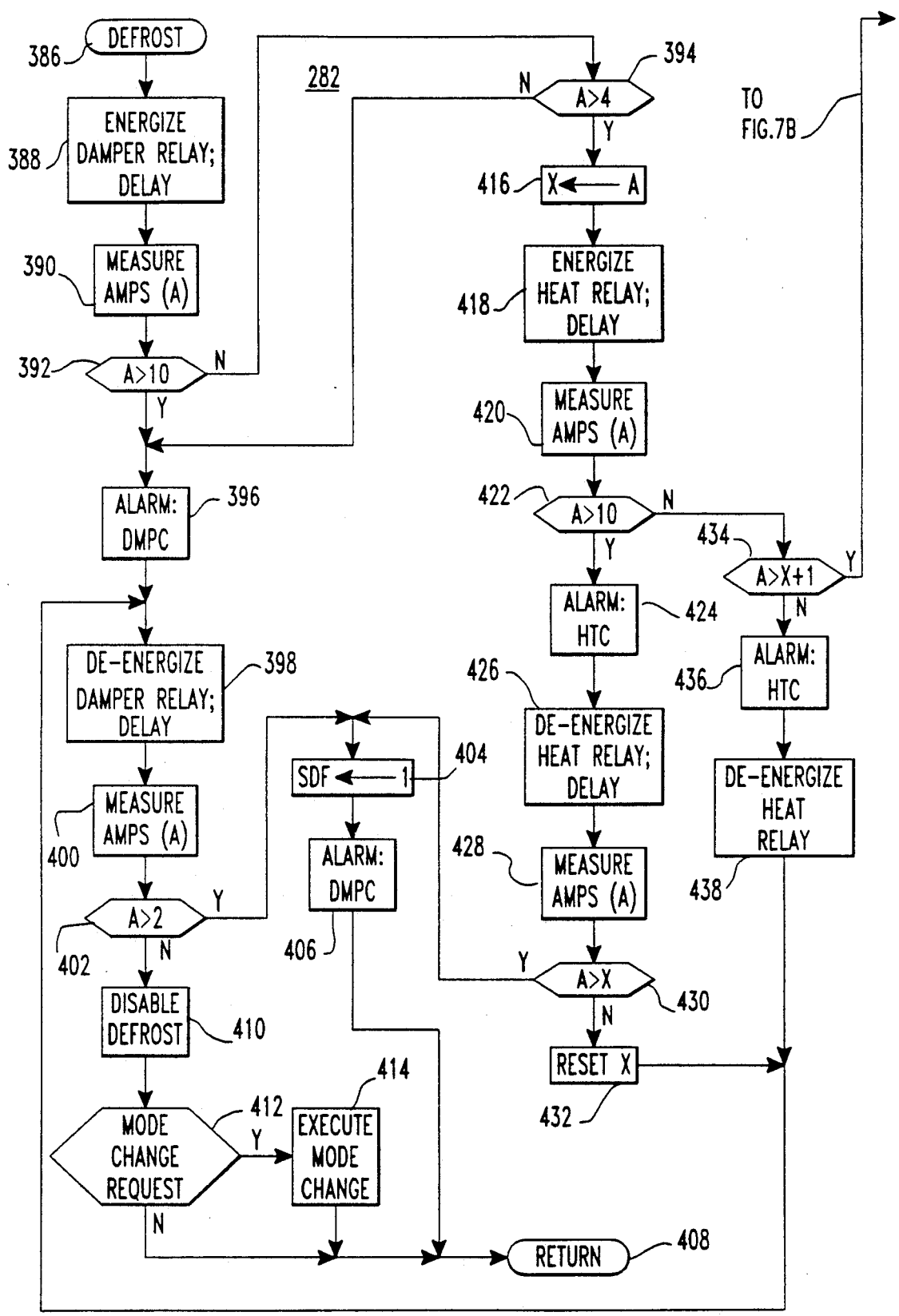
FIGS. 7A and 7B are flow diagrams called by the program of FIG. 3 which monitor a requested change to a defrost operating mode.
Figure 7B:
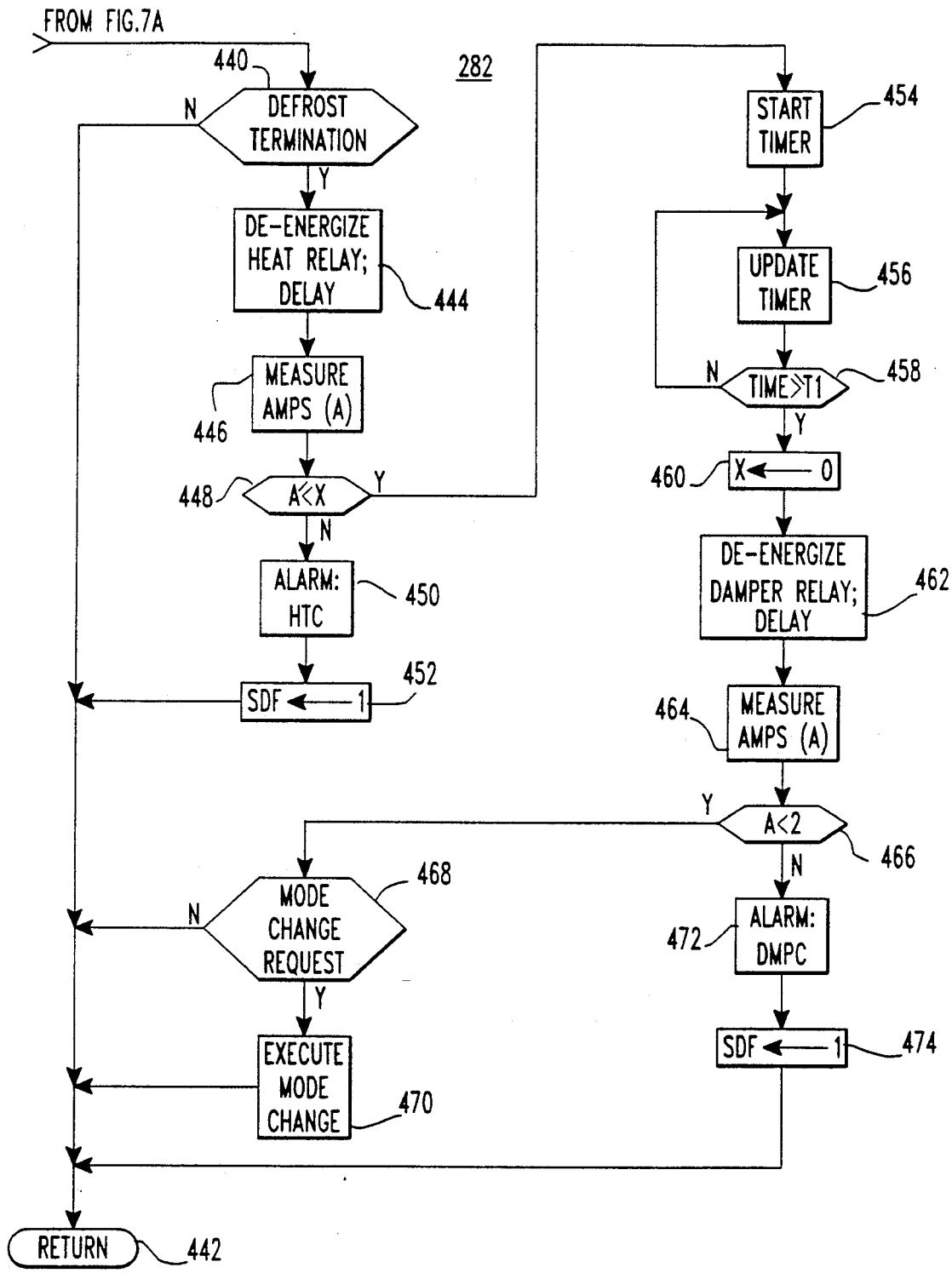

When step 280 of FIG. 3 detects the need to defrost evaporator coil 62 shown in FIG. 1, such as detected by defrost sensor 210, by a defrost timer, or a manually entered request for defrost, for example, program 282 illustrated in FIGS. 7A and 7B is entered at 386. Step 388 energizes damper relay 164 via driver output line 218 and step 390 measures the current draw through control shunt 131. Steps 392 and 394 compare the measured current draw with the upper and lower limits of an appropriate current draw window, such as 10 amperes and 4 amperes, respectively. If the upper limit is exceeded, step 392 proceeds to step 396 which records an alarm DMPC, indicating a fault in damper relay 164 or its wiring, and a flashing alarm icon on display 125 is energized.

Step 398 then immediately de-energizes damper relay 164 and step 400 measures the current flow through control shunt 131. Step 402 compares the measured current draw with a maximum allowable current reference value, e,g., 2 amperes, to determine if damper relay 164 dropped out properly in response to step 398. If the latest measured current draw exceeds the reference value of 2 amperes, damper relay 164 failed to drop out properly and the high current condition detected by step 392 still exists. Thus, step 402 advances to step 404 which initiates unit shut down, and step 406 records alarm DMPC. In this instance alarm DMPC was previously recorded in step 396, but step 406 is necessary as step 398 can be entered via another branch, as will be hereinafter described. Program 282 then exits at 408.

If step 402 finds that the latest current measurement, i.e., the measurement in step 400, does not exceed the maximum allowable current draw reference value, damper relay 164 dropped out properly and step 410 disables the defrost mode. Step 410 proceeds to steps 410 and 412 which allows unit 20 to continue to run, but the appropriate running mode will not be the requested defrost mode, as the defrost mode has now been disabled in step 410.

If the current measurement of step 390 passed test 392 but step 394 finds that the current measurement is below the lower limit of 4 amperes, damper relay 164 apparently failed to pick up, and step 394 returns to step 396 and thus to the portion of program 282 just described.

If the current draw measurement of step 390 is within the allowable current draw window, step 416 stores the current draw reading of step 390 at a location "X" in RAM 124 for later use, and step 418 energizes heat relay 160 via driver line 224. Step 420 measures the current draw through control shunt 131 and steps 422 and 434 apply upper and lower limit current window tests to the measured value. Step 422, for example may compare the current draw measurement with an upper limit of 10 amperes, and if this value is exceeded, step 424 records alarm HTC which indicates the heat relay 160 and associated wiring should be checked, the alarm icon is flashed, and step 426 immediately de-energizes the heat relay. Step 428 measures the current flow through control shunt 131 and step 430 determines if the measurement exceeds the stored value "X". If the measured value "A" exceeds the stored value "X" it indicates that heat relay 160 failed to drop out properly and the high current condition detected in step 422 still exists. Thus step 430 immediately advances to the hereinbefore described step 404 to initiate unit shut down.

When step 430 finds that the latest current draw measurement, i.e., the measurement of step 428, does not exceed the stored value "X", heat relay 160 dropped out properly, and step 432 resets "X" to zero. Since defrost cannot continue without the heating mode, step 432 returns to the hereinbefore described step 398 to de-energize damper relay 164, with step 406 recording an alarm if damper relay 164 fails to drop out properly.

When step 422 finds that the current draw measurement of step 420 does not exceed the upper limit of the allowable current draw window, step 434 checks the measurement of step 420 with a lower limit, which may be equal to the stored value "X" plus 1 ampere, for example, to determine if heat relay 160 picked up properly in step 418. If step 434 finds heat relay 160 apparently failed to pick up, step 436 records alarm HTC and flashes the alarm indicator on display 125. Step 438 de-energizes driver line 224 to heat relay 160, and step 438 returns to step 398, to de-energize damper relay 164, since the defrost mode cannot continue without a properly functioning heat relay 160.

When the current draw measurement of step 420 passes the tests of steps 422 and 434, the defrost mode is proceeding properly with the damper relay 164 energized, which energizes damper solenoid 184 to close defrost damper 93, and with heat relay 160 energized which energizes pilot solenoid to switch three-way valve 36 to select the heating refrigerant circuit 72. Program 282 then advances to step 440 in FIG. 7B, which detects when a defrost timer expires, or some other event occurs which indicates the need for defrost has ended. Until step 440 detects that defrost should be terminated, program 282 exits at 442.

When step 440 detects a request to terminate defrost, step 440 advances to step 444 which de-energizes heat relay 160. Step 446 measures the current draw via control shunt 131 and step 448 compares the measurement with the stored value "X". If the measurement is not equal to or less than "X", it indicates heat relay 160 failed to drop out properly and unit 20 should be shut down. Accordingly, step 450 records alarm HTC and flashes the alarm icon, step 452 sets the shut down flag SDF true, and program 282 exits at 442.

When step 448 finds that heat relay 160 dropped out properly, step 448 advances to step 454 to start a software delay timer which provides a delay sufficient for the cooling mode, which started with step 444, to cool evaporator coil 62 before opening defrost damper 93. An exemplary time value is 30 seconds. Step 456 updates the software timer, and step 458 determines when the delay time has expired. Step 458 is illustrated as returning to step 456, but step 458 actually returns to exit 442, to enable controller 96 to control other functions during the 30 second delay time.

When step 458 detects that the delay time has expired, step 460 resets the stored value "X" to zero, step 462 de-energizes damper relay 164, and step 464 measures the current draw through control shunt 131. Step 466 compares this latest current measurement with a maximum allowable current reference value, such as 2 amperes, to determine if damper relay 164 dropped out properly. If step 466 finds that damper relay 164 dropped out, steps 468 and 470 proceed to return unit 20 to the proper operating mode. If step 466 detects a problem, the defrost damper 93 may still be closed and step 472 records the appropriate alarm DMPC and flashes an alarm indicator, step 474 initiates unit shut down by setting flag SDF true, and program 282 exits at 442.

Figure 8A:
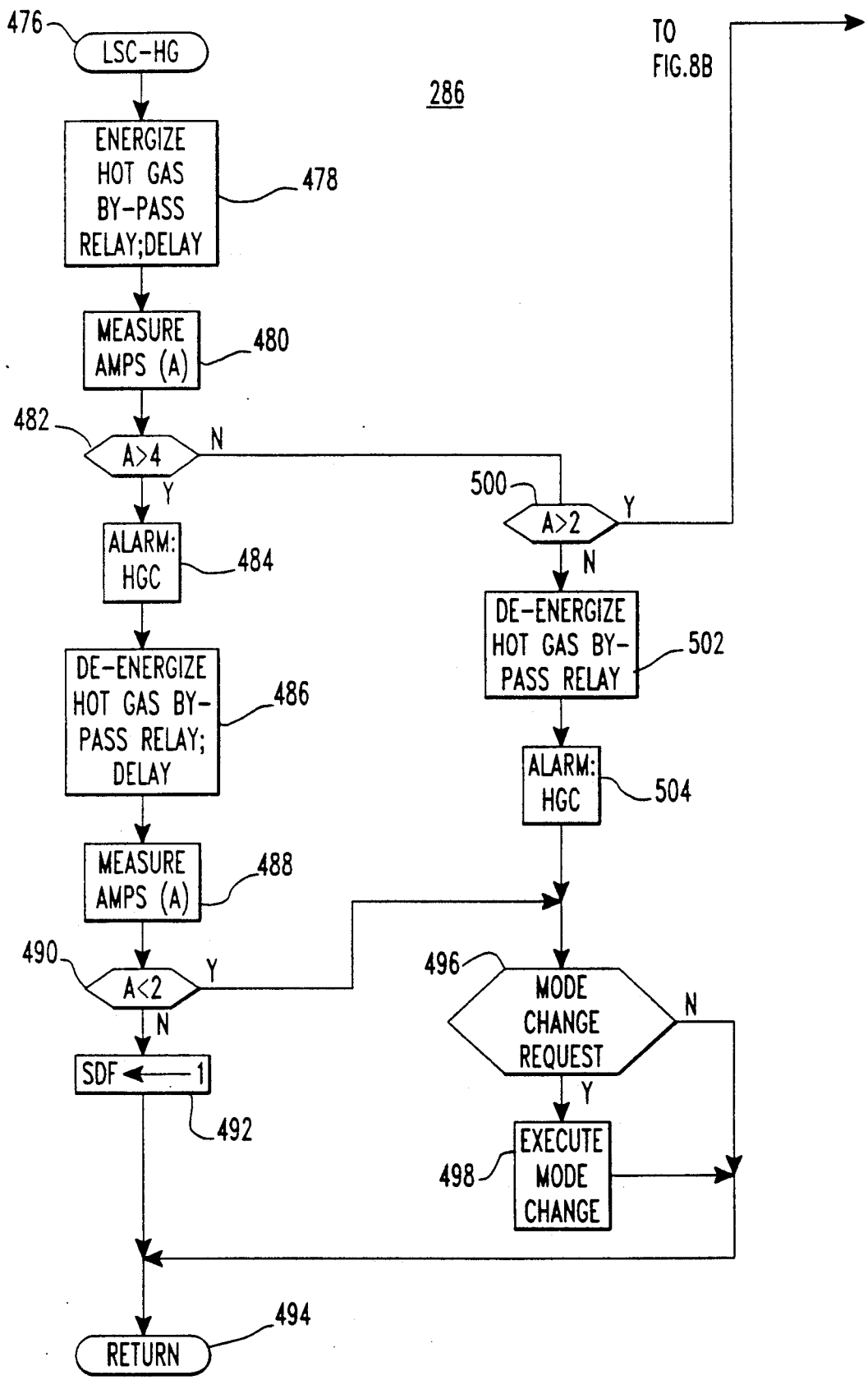
FIGS. 8A and 8B are flow diagrams called by the program of FIG. 3 which monitor and control a requested change to a low speed cool- hot gas operating mode, with and without suction line modulation.
Figure 8B:
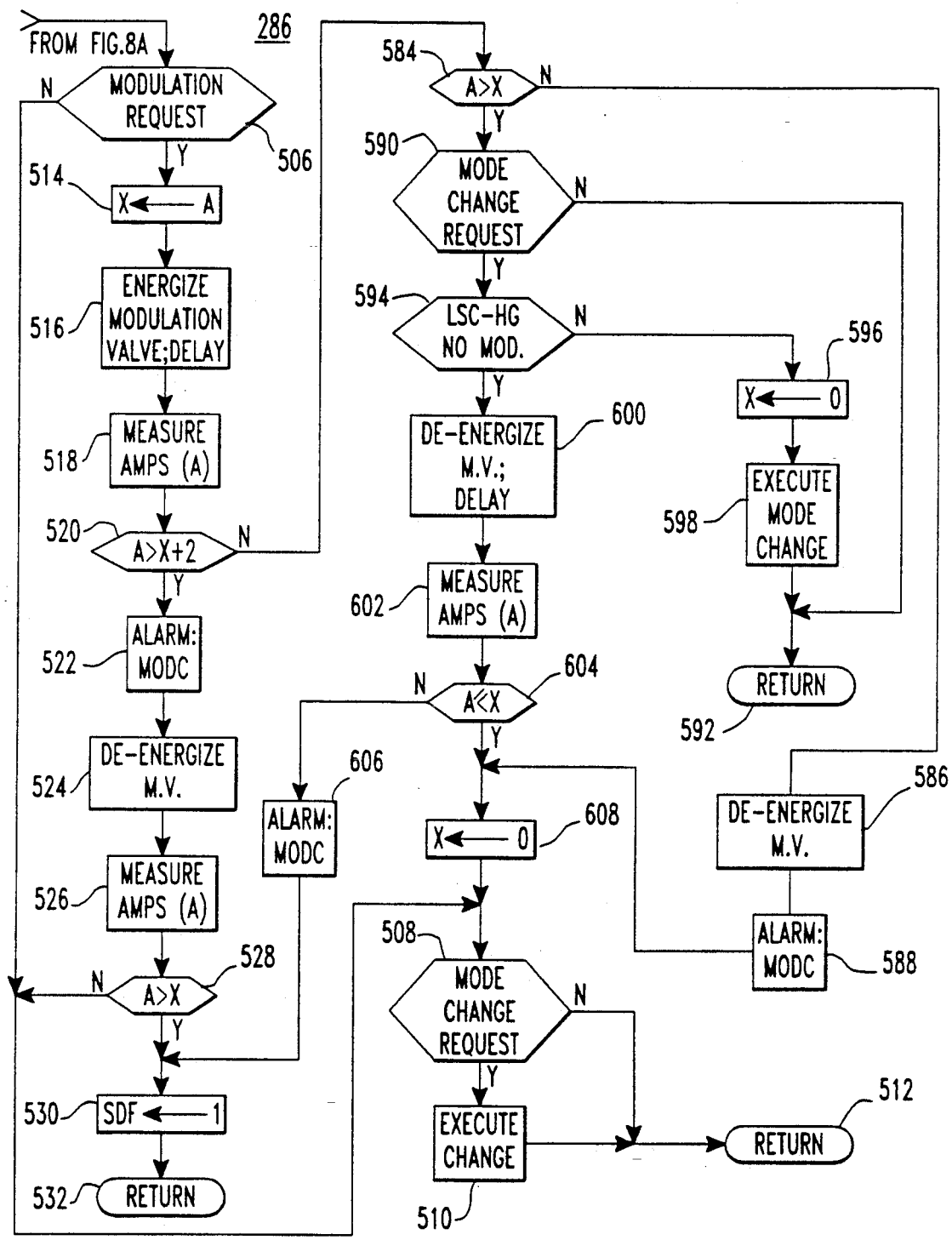

When step 284 of FIG. 3 detects the request for low speed cool mode with hot gas injection into the evaporator coil 62, step 284 enters program 286 shown in FIGS. 8A and 8B. Program 286 is entered at 476 and step 478 energizes hot gas by-pass relay 166 via driver line 226. Step 480 measures the current flow through control shunt 131 and steps 482 and 500 apply appropriate upper and lower limit current draw window tests to the measured current value. If the measured value "A" exceeds the upper limit, e.g., 4 amperes, step 484 records an alarm code HGC which indicates the hot gas relay 166 and circuitry should be checked, an alarm icon is flashed, and step 486 immediately de-energizes hot gas relay 166.

Step 488 measures the current draw through control shunt 131, and step 490 compares the measurement with a maximum allowable current reference value, e.g., 2 amperes, to determine if hot gas relay 166 dropped out properly. If the comparison step 490 indicates that hot gas relay 166 did not drop out, step 492 initiates unit shut down by setting flag SDF true, and program 286 exits at 494. When step 490 finds hot gas relay 166 dropped out, step 490 proceeds to steps 496 and 498, which executes an appropriate mode change, if the request is still valid, with the mode change not including hot gas injection, as this feature has been found to be faulty and not available.

If the current measurement of step 480 passes the upper limit test of step 482, but fails the lower limit test of step 500, hot gas relay 166 apparently failed to pick up in response to step 478 and step 502 de-energizes driver line 226. Step 504 records the alarm code HGC and flashes the alarm icon, and steps 496 and 498 allow unit 20 to remain in operation, in any mode except LSC-HG, since hot gas injection is not available.

When step 500 finds that the current measurement of step 480 passes both the upper and lower limit tests of step 482 and 500, program 286 advances to step 506 in FIG. 8B. Step 506 determines if the low speed cool, hot gas mode LSC-HG is to be accompanied with suction line modulation. If suction line modulation has not been requested, step 506 proceeds to steps 508 and 510, which execute the LSC-HG mode, if the request for the mode change is still valid, and program 286 exits at 512.

When step 506 finds that modulation has been requested, step 514 stores the current draw measurement made in step 480 at a location "X" in RAM 124 for later use, and step 516 energizes modulation valve 64 via driver line 228. Controller 96 provides a predetermined current flow through valve 64, not to exceed a predetermined value, such as a maximum of 1.4 amperes, for example, which should partially close valve 64 to a predetermined point. Step 518 measures the current flow through control shunt 131 and step 520 compares the measured value with a maximum allowable current reference value, such as the stored value "X" plus 2 amperes. If the current draw measurement of step 518 exceeds the reference value X+2, there is a problem with modulation valve 64 and step 524 immediately de-energizes modulation valve 64. Step 526 measures the current flow through control shunt 131 and step 528 determines if modulation valve 64 responded properly by comparing the measured value with the stored value "X". If the measured value exceeds the stored value, there is a problem with modulation valve 64 and step 530 initiates shut down of unit 20 by setting flag SDF true, and program 286 exits at 532.

When step 528 finds that the current draw measurement of step 526 does not exceed the stored value "X", modulation valve 64 responded properly to step 524 and step 528 proceeds to steps 508 and 510 which executes the requested mode change LSC-HG with modulation, if the request is still valid.

When step 520 finds that the current draw measurement of step 518 passes the upper limit test of step 520, step 584 determines if modulation valve 64 is energized by comparing the current draw measurement of step 518 with the stored value "X". If the current draw measurement does not exceed the stored value "X", modulation valve 64 failed to close at all, step 586 de-energizes driver line 228 to valve 64, step 588 records alarm code MODC which indicates the modulation valve 64 and its circuitry should be checked, and the alarm icon is flashed. Unit 20 is allowed to run, without suction line modulation, by proceeding to step 608, which resets the stored value "X" to zero, and step 608 proceeds to steps 508 and 510, which implement the LSC-HG mode, without modulation, and program 286 exits at 512.

When step 584 finds that the current draw measurement of step 518 passes the lower limit test, step 584 proceeds to step 590 which determines if there is still a valid request for a mode change. If no mode change request is found, step 590 exits program 286 at 592. Upon finding a valid request to change operating modes, step 590 proceeds to step 594 which determines if the mode change is low speed cool with hot gas injection (LSC-HG), with or without suction line modulation. If step 594 finds the requested mode is LSC-HG with suction line modulation the controls are already set for this operating mode and step 596 resets the stored value "X" to zero, step 598 executes the mode change, and program 286 exits at 592.

Should step 594 find that suction line modulation is no longer being called for, step 600 de-energizes modulation valve 64 and step 602 measures the current draw through control shunt 131. The current draw measurement is compared with the stored value "X" in step 604 to determine if valve 64 responded properly to step 600. If the current draw measurement of step 602 is found to exceed the stored value "X", modulation valve 64 is still drawing current and step 606 records the alarm code MODC and flashes the alarm icon. Step 606 then proceeds to step 530 which initiates shut down of unit 20.

When step 604 finds that modulation valve 64 is no longer drawing current and thus responded properly to step 600, step 608 resets the stored value "X" to zero, steps 508 and 510 implement the presently desired operating mode, and program 286 exits at 512.

Figure 9:
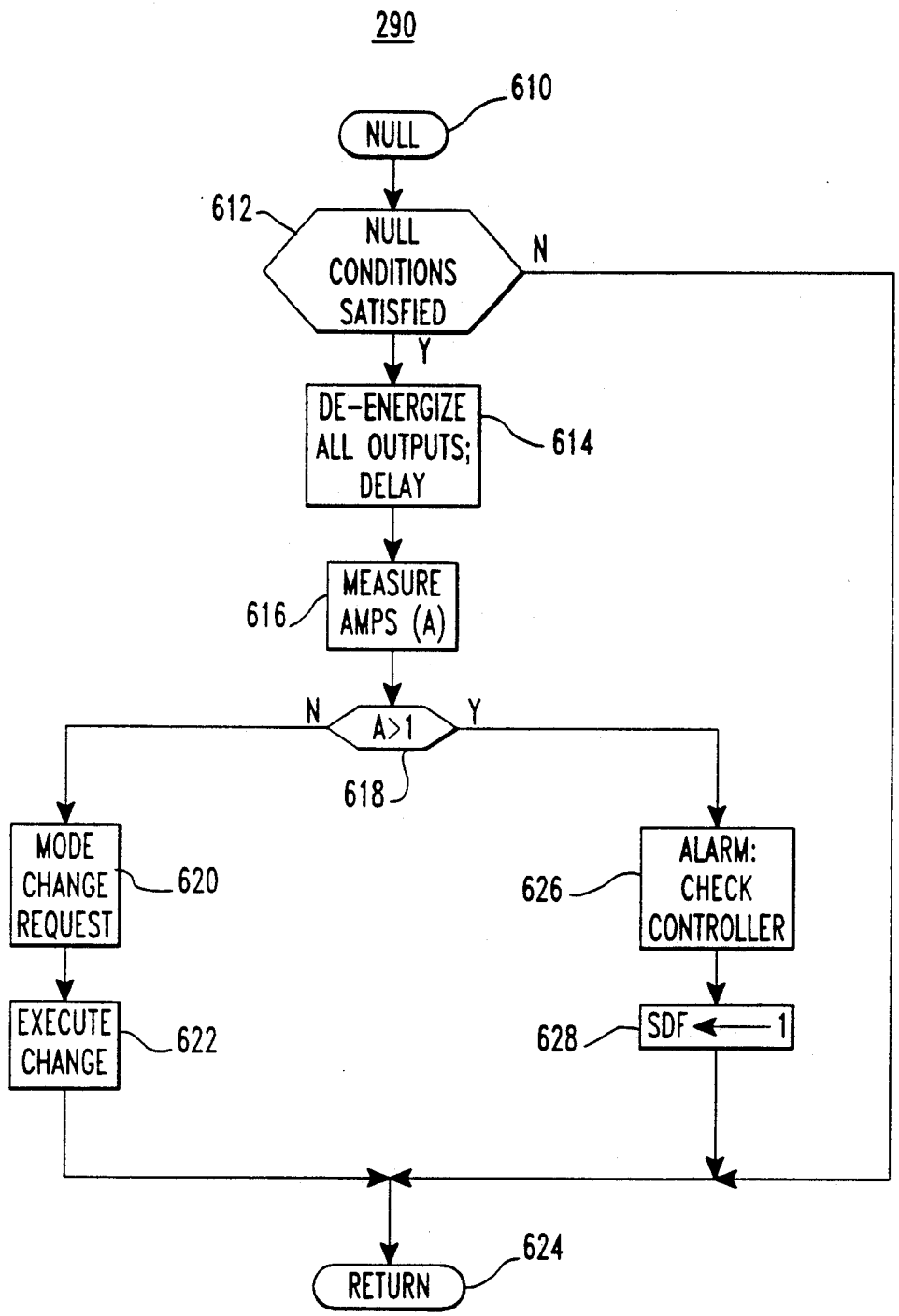
FIG. 9 is a flow diagram called by the program of FIG. 3 which monitors and controls a requested change to a null operating mode when the temperature requirement of a conditioned space is satisfied.

When step 288 in FIG. 3 is reached there are no requests for an operational mode change, and when step 288 finds that unit 20 is set to operate in an on-off cycling mode, as opposed to a continuous mode, step 288 advances to the program 290 shown in FIG. 9, which is entered at point 610. Step 612 determines if all of the null conditions are satisfied, such as disclosed in the hereinbefore mentioned U.S. Pat. No. 5,140,826. If the conditions for operating unit 20 in a null mode are satisfied, prime mover arrangement 28 is shut down and no driver output lines of controller 96 need be energized. This provides an opportunity to again check controller 96 for internal faults, as performed in FIG. 3 via steps 242 through 250. More specifically, step 614 de-energizes all of the driver output lines, step 616 measures the current draw through control shunt 131, and step 618 determines if the current draw exceeds a maximum allowable current draw reference value, such as 1 ampere. If the comparison step 618 is passed, steps 620 and 622 execute the change to the null operating mode, if the request is still valid.

When step 618 finds an excessive current draw with all driver output lines de-energized, step 626 stores an alarm code indicating controller 96 should be checked, an alarm icon is flashed, step 628 initiates shut down of unit 20 by setting shut down flag SDF true, and program 290 exits at 624.

When step 612 finds that all conditions for entering the null mode are not satisfied, step 612 simply exits program 290 at 624.

We claim:

1. A method of operating and monitoring a refrigeration unit which includes electrical control having a voltage source, a control circuit which includes a plurality of control devices, and a controller which selectively energizes and de-energizes the control devices via a plurality of control outputs, comprising the steps of:

determining if the refrigeration unit is running, de-energizing the control outputs of the controller when the determining step finds the refrigeration unit is not running, measuring the magnitude of the current draw of the control circuit from the voltage source with the control outputs of the controller de-energized, providing a current reference value which indicates the maximum allowable current draw with the control outputs of the controller de-energized, comparing the measured current draw with the reference value, and providing an alarm which indicates the controller should be checked when the measured current draw exceeds the reference value.

2. The method of claim 1 wherein the plurality of control components includes a predetermined control device which enables starting of the refrigeration unit, and including the steps of:

determining if the unit should be started when the unit is found not running, energizing the predetermined control device which enables the starting of the refrigeration unit, when the unit should be started, measuring the magnitude of the current draw of the control circuit after the predetermined control device is energized, providing a current draw window having upper and lower limits which define an allowable current draw range for the control circuit with the predetermined control device energized, comparing the latest measured current draw with the current draw window, starting the unit when the measured current draw is within the limits of the current draw window, and de-energizing the predetermined control device when the measured current draw is not within the limits of the current draw window.

3. The method of claim 2 wherein the refrigeration unit is operable in selectable different operating modes, with the plurality of control devices including a control device associated with each operating mode, and including the steps of:

running the unit, after the starting step, in a predetermined initial operating mode, determining when a different operating mode is required, energizing the control device associated with the different operating mode, measuring the magnitude of the current draw of the control circuit after the control device of the different operating mode is energized, providing a current draw window having upper and lower limits which define an allowable current draw range for the control circuit with the control device of the different operating mode energized, comparing the latest measured current draw with the current draw window, and initiating the different operating mode when the latest measured current draw is within the limits of the current draw window.

4. The method of claim 3 including the steps of:

providing an alarm when the latest measured current draw is not within the limits of the current draw window, allowing the unit to operate with the control device of the different operating mode energized when the latest measured current draw is less than the lower limit of the current draw window, and shutting the unit down when the latest measured current draw exceeds the upper limit of the current draw window.

5. The method of claim 3 including the steps of:

providing an alarm when the latest measured current draw is not within the limits of the associated current draw window, allowing the unit to operate with the control device of the different operating mode energized when the latest measured current draw is less than the lower limit of the associated current draw window, de-energizing the control device when the latest measured current draw exceeds the upper limit of the associated current draw window, measuring the current draw after the control device of the different operating mode is de-energized, providing a maximum current reference value which indicates the maximum allowable current with the control device of the different operating mode de-energized, comparing the latest measured current draw with the maximum current reference value, allowing the unit to run with the control device of the different operating mode de-energized when the latest measured current draw does not exceed the maximum current reference value, and shutting the unit down when the latest measured current draw exceeds the maximum current reference value.

6. The method of claim 2 wherein the starting step started the unit running, and wherein the refrigeration unit controls a conditioned space to a predetermined null temperature range adjacent to a selected set point temperature via heating, cooling and null cycles, and including the steps of:

determining when conditions for a null cycle are satisfied, de-energizing the control outputs of the controller when the determining step finds that conditions for a null cycle are satisfied, measuring the magnitude of the current draw of the control circuit with the control outputs of the controller de-energized, providing a current reference value which indicates the maximum allowable current draw with the control outputs of the controller de-energized, comparing the latest measured current draw with the reference value, initiating a null cycle when the latest measured current draw does not exceed the reference value, and providing an alarm which indicates the controller should be checked when the latest measured current draw exceeds the reference value.

7. A method of operating and monitoring a refrigeration unit operable in a plurality of different selectable operating modes, including electrical control having a voltage source, a control circuit which includes a plurality of control devices associated with the plurality of operating modes, and a controller which selectively energizes and de-energizes the control devices via a plurality of control outputs, comprising the steps of:

determining when a change from one operating mode to a different operating mode is required, energizing the control device associated with the different operating mode, measuring the magnitude of the current draw of the control circuit after the control device of the different operating mode is energized, providing a current draw window having upper and lower limits which define an allowable current draw range for the control circuit with the control device of the different operating mode energized, comparing the measured current draw with the current draw window, and initiating the different operating mode when the measured current draw is within the current draw window.

8. The method of claim 7 wherein the plurality of control devices includes a predetermined control device which enables starting of the refrigeration unit, and including the steps of:

determining if the unit should be started when the unit is not running, energizing the predetermined control device which enables the starting of the refrigeration unit, when the unit should be started, measuring the magnitude of the current draw of the control circuit after the predetermined control device is energized, providing a current draw window having upper and lower limits which define an allowable current draw range for the control circuit with the predetermined control device energized, comparing the latest measured current draw with the current draw window, starting the unit when the measured current draw is within the limits of the current draw window, and de-energizing the predetermined control device when the measured current draw is not within the current draw window.

9. The method of claim 8 including the step of running the unit, after the starting step, in a predetermined initial operating mode.

10. The method of claim 8 including the step of providing an alarm which indicates the predetermined control device should be checked when the latest measured current draw is not within the associated current draw window.

11. The method of claim 7 wherein the refrigeration unit is operable in low and high speed modes and the electrical control includes a high speed control device controllable by an output of the controller which is energized to change to a high speed mode, and including the steps of:

determining when a high speed mode is required, energizing the high speed control device when the high speed mode is required, measuring the magnitude of the current draw of the control circuit with the high speed control device energized, providing a current draw window having upper and lower limits which define an allowable current draw range for the control circuit with the high speed control device energized, comparing the latest measured current draw with the current draw window, and initiating the high speed mode when the latest measured current draw is within the current draw window.

12. The method of claim 11 including the steps of:

providing an alarm when the latest measured current draw is outside the associated current draw window, allowing the unit to operate with the high speed control device energized when the measured current is below the lower limit of the current draw window, de-energizing the high speed control device when the measured current draw exceeds the upper limit of the current draw window, measuring the current draw after the high speed control device is de-energized, providing a maximum allowable current reference value, comparing the latest measured current draw with the reference value, allowing the unit to operate with the high speed control device de-energized when the comparison step finds that the measured current draw does not exceed the reference value, and shutting the unit down when the comparison step finds that the measured current draw exceeds the reference value.

13. The method of claim 7 wherein the refrigeration unit is operable in cooling and heating modes and the electrical control includes a heat control device controllable by an output of the controller which is energized to change from a cooling mode to a heating mode, and including the steps of:

determining when a heating mode is required, energizing the heat control device, measuring the magnitude of the current draw of the control circuit with the heat control device energized, providing a current draw window having upper and lower limits which define an allowable current draw range for the control circuit with the heat control device energized, comparing the latest measured current draw with the current draw window, and initiating the heating mode when the measured current draw is within the current draw window.

14. The method of claim 13 wherein the refrigeration unit controls the temperature of a conditioned space to a selected set point temperature, and including the steps of:

determining if the selected set point temperature is above or below a predetermined value which respectively indicates non-frozen and frozen loads in the conditioned space, allowing the unit to operate with the heat control device energized when the latest measured current draw is below the lower limit of the current draw window and the selected set point temperature indicates a frozen load, shutting the unit down when the measured current draw is below the lower limit of the current draw window and the selected set point temperature indicates a nonfrozen load, de-energizing the heat control device when the latest measured current draw exceeds the upper limit of the current draw window, measuring the current draw after the heat control device is de-energized, providing a maximum allowable current reference value, comparing the latest measured current draw with the reference value, allowing the unit to operate with the heat control device de-energized when the comparison step finds that the latest measured current draw does not exceed the reference value and the selected set point temperature indicates a frozen load, shutting the unit down when the comparison step finds that the latest measured current draw exceeds the reference value, and shutting the unit down when the comparison step finds that the latest measured current draw is less than the reference value and the selected set point temperature indicates a non-frozen load.

15. The method of claim 13 wherein the refrigeration unit is operable in low and high speed modes and the electrical control includes a high speed control device controllable by an output of the controller which is energized to change to a high speed heat mode, and including the steps of:

determining when a high speed heat mode is required when the heat control device is energized, energizing the high speed control device, measuring the magnitude of the current draw of the control circuit with the heat control device and the high speed control device energized, providing a current draw window having upper and lower limits which define an allowable current draw range for the control circuit with the heat control device and the high speed control device energized, comparing the latest measured current draw with the current draw window, and initiating the high speed heat mode when the measured current draw is within the limits of the current draw window.

16. The method of claim 15 including the steps of:

providing an alarm when the latest measured current draw is outside the limits of the current draw window, allowing the unit to operate with the high speed control device energized when the latest measured current draw is below the lower limit of the current draw window, de-energizing the high speed control device when the measured current draw exceeds the upper limit of the current draw window, measuring the current draw after the high speed control device is de-energized, providing a maximum allowable current reference value, comparing the latest measured current draw with the reference value, allowing the unit to operate with the high speed control device de-energized when the comparison step finds that the latest measured current draw does not exceed the reference value, and shutting the unit down when the comparison step finds that the latest measured current draw exceeds the reference value.

17. The method of claim 7 wherein the refrigeration unit is operable in a defrost mode, with the refrigeration unit including an evaporator coil, a defrost damper, and a damper control device controllable by an output of the controller, and including the steps of:

determining when a defrost mode should be initiated to defrost the evaporator coil, energizing the damper control device when a defrost mode is required, measuring the magnitude of the current draw of the control circuit with the damper control device energized, providing a current draw window having upper and lower limits which define an allowable current draw range for the control circuit with the damper control device energized, comparing the latest measured current draw with the current draw window, providing an alarm when the latest measured current draw is outside the limits of the current draw window, de-energizing the damper control device when the measured current draw is outside the limits of the current draw window, measuring the current draw after the damper control device is de-energized, providing a maximum allowable current reference value, comparing the latest measured current draw with the reference value, allowing the unit to operate with the damper control device de-energized, and disabling the defrost mode, when the comparison step finds that the latest measured current draw does not exceed the reference value, and shutting the unit down when the comparison step finds that the latest measured current draw exceeds the reference value.

18. The method of claim 17 wherein the control includes a heat control device controllable by an output of the controller, and including the steps of:

storing the measured current draw when the current draw for the damper control device is within the limits of the associated current draw window, energizing the heat control device when the current draw for the damper control device is within the limits of the associated current draw window, measuring the magnitude of the current draw of the control circuit with the damper control device and the heat control device energized, providing a current draw window having upper and lower limits which include the value stored in the storing step, to provide a current draw window which defines an allowable current draw range for the control circuit with the heat control device and damper control device both energized, comparing the latest measured current draw with the associated current draw window, and initiating the defrost mode when the latest measured current draw is within the current draw window.

19. The method of claim 18 including the steps of:

providing an alarm when the measured current draw with the damper control device and the heat control device both energized is outside the associated current draw window, de-energizing the heat control device when the measured current draw with the damper control device and the heat control device both energized is outside the current draw window, measuring the current draw after the heat control device is de-energized, when the upper limit of the associated current draw window is exceeded, comparing the latest measured current draw with the stored current draw, shutting the unit down when the measured current draw exceeds the stored current draw, de-energizing the damper control device when the measured current draw does not exceed the stored current draw, and also when the measured current draw with both the damper and heat control devices energized is below the lower limit of the associated current draw window, measuring the current draw after the damper control device is de-energized, providing a maximum allowable current draw reference value, comparing the latest measured current draw with the reference value, allowing the unit to operate with the damper control device de-energized when the latest measured current draw does not exceed the reference, and shutting the unit down when the comparison step finds that the latest measured current draw exceeds the reference value.

20. The method of claim 18 including the steps of:

detecting when the defrost mode should be terminated, de-energizing the heat control device when the detecting step detects termination of defrost, measuring the current draw after the heat control device is de-energized, comparing the latest measured current draw with the stored current draw, providing an alarm when the latest measured current draw exceeds the stored current draw, shutting the refrigeration unit down when the latest measured current draw exceeds the stored current draw, de-energizing the damper control device when the measured current draw does not exceed the stored current draw, measuring the current draw after the damper control device is de-energized, providing a maximum allowable current reference value, comparing the latest measured current draw with the reference value, allowing the unit to run when the comparison step finds the latest measured current draw does not exceed the reference value, providing an alarm when the comparison step finds the latest measured current draw exceeds the reference value, and shutting the unit down when the comparison step finds the latest measured current draw exceeds the reference value.

21. The method of claim 20 including the step of providing a delay before the damper control device is de-energized, to allow the evaporator coil to cool before the defrost damper is opened by the damper control device.

22. The method of claim 7 wherein the refrigeration unit is operable in a hot gas by-pass mode and the electrical control includes a hot refrigerant gas by-pass control device controllable by an output of the controller which is energized to initiate a hot gas by-pass mode, and including the steps of:

determining when a hot gas by-pass mode is required, energizing the hot gas by-pass control device, measuring the magnitude of the current draw of the control circuit with the hot gas by-pass control device energized, providing a current draw window having upper and lower limits which define an allowable current draw range for the control circuit with the hot gas by-pass control device energized, comparing the latest measured current draw with the current draw window, providing an alarm when the latest measured current draw is outside the limits of the current draw window, de-energizing the hot gas by-pass control device when the latest measured current draw is less than the lower limit of the current draw window, allowing the unit to run with the hot gas by-pass control device energized when the latest measured current draw is less than the lower limit of the current draw window, de-energizing the hot gas by-pass control device when the latest measured current draw exceeds the upper limit of the current draw window, measuring the current draw after the hot gas by-pass control device is de-energized, providing a maximum allowable current reference value for the current draw with the hot gas by-pass control device de-energized, comparing the latest measured current draw with the reference value, allowing the unit to run with the hot gas by-pass control device de-energized when the latest measured current draw does not exceed the reference value, and shutting the unit down when the latest measured current draw exceeds the reference value.

23. The method of claim 22 wherein the refrigeration unit is operable in a suction line modulation mode, and the refrigeration unit includes a suction line modulation valve, and including the steps of:

determining if the suction line modulation mode is required after the measured current draw is found to be within the associated current draw window, operating the unit with the hot gas by-pass control device energized when the determining step finds that the modulation mode is not required, storing the measured current draw when the determining step finds that the modulation mode is required, energizing the modulation valve when the determining step finds that the modulation mode is required, measuring the current draw after the step of energizing the modulation valve, providing a current draw window having upper and lower limits which include the stored value, defining an allowable current draw range for the control circuit with the hot gas by-pass control device and modulation valve both energized, comparing the latest measured current draw with the current draw window, and initiating the hot gas by-pass mode with the modulation mode when the latest measured current draw is within the limits of the associated current draw window.

24. The method of claim 22 including the steps of:

determining when the modulation mode is not required, de-energizing the modulation valve when the modulation mode is not required, measuring the current draw after the de-energizing step, comparing the latest measured current draw with the stored value, allowing the unit to operate with the modulation valve de-energized when the comparison step finds the latest measured current draw does not exceed the stored value, and shutting the unit down when the comparison step finds that the latest measured current draw exceeds the stored value.

25. The method of claim 22 including the steps of:

providing an alarm and de-energizing the modulation valve when the measured current draw with the hot gas by-pass control device and modulation valve both energized is not within the associated current draw window, allowing the unit to operate when the measured current draw is less than the lower limit of the current draw window, measuring the current draw after the step of de-energizing the modulation valve when the latest measured current draw exceeds the upper limit of the current draw window, comparing the latest measured current draw with the stored value, allowing the unit to run when the latest measured current draw does not exceed the stored value, and shutting the unit down when the latest measured current draw exceeds the stored value.

26. Control apparatus for monitoring and controlling the operation of a refrigeration unit, with the electrical control apparatus including a voltage source, a control circuit which includes a plurality of control devices, and a controller which selectively activates the control devices via a plurality of control outputs, comprising:

a current shunt disposed between the voltage source and the control circuit, means determining if the refrigeration unit is operating, means de-energizing the control outputs of the controller when the refrigeration unit is not operating, means measuring the magnitude of the current draw of the control circuit with the control outputs of the controller de-energized, means providing a current reference value which indicates the maximum allowable current draw with the control outputs of the controller de-energized, means comparing the measured current draw with the reference value, and means providing an alarm which indicates the controller should be checked when the measured current draw exceeds the reference value.

27. The apparatus of claim 26 including:

means for determining if the unit should be started when the unit is found not running, a control device which, when energized, enables the starting of the refrigeration unit, means energizing said control device, means measuring the magnitude of the current flow through the current shunt with the control device energized, means providing a current draw window having upper and lower limits which define an allowable current draw range for the control circuit with the control device energized, means comparing the latest measured current draw with the current draw window, means starting the unit when the latest measured current draw is within the limits of the current draw window, and means de-energizing the control device when the latest measured current draw is not within the limits of the current draw window.

28. The apparatus of claim 27 including:

means operating the unit, after starting, in a predetermined initial operating mode which requires continuous energization of the control device by the controller, means providing a plurality of different operating modes, including a control device controllable by an output of the controller for each of the plurality of different operational modes, means determining when a different operating mode is desired, means energizing the control device associated with the different operating mode, means measuring the magnitude of the current flowing through the current shunt when the control device of the different mode energized, means providing a current draw window having upper and lower limits which define an allowable current draw range for the control circuit with the control device of the different mode energized, means comparing the latest measured current draw with the current draw window, and means initiating the desired different operating mode when the measured current draw is within the limits of the current draw window.

29. The apparatus of claim 28 including:

means providing an alarm when the latest measured current draw is not within the limits of the associated current draw window, means allowing the unit to operate when the latest measured current draw is below the lower limit of the current draw window, means de-energizing the control device when the latest measured current draw exceeds the upper limit of the current draw window, means measuring the current draw with the control device de-energized, means providing a maximum current reference value, means comparing the latest measured current draw with the maximum current reference value, means allowing the unit to run when the latest measured current draw does not exceed the maximum current reference value, and means shutting the unit down when the latest measured current draw exceeds the maximum current reference value.

30. The apparatus of claim 26 wherein the voltage source includes a battery and generator means, and including an additional current shunt connected to measure battery current.

* * * * *